United States Patent
Togino

[11] Patent Number: 5,963,376
[45] Date of Patent: Oct. 5, 1999

[54] VARIABLE-MAGNIFICATION IMAGE-FORMING OPTICAL SYSTEM

[75] Inventor: Takayoshi Togino, Koganei, Japan

[73] Assignee: Olympus Optical Co., Ltd., Tokyo, Japan

[21] Appl. No.: 08/979,704

[22] Filed: Nov. 26, 1997

[30] Foreign Application Priority Data

Nov. 27, 1996 [JP] Japan .................................. 8-316115

[51] Int. Cl.⁶ .......................... G02B 15/14; G02B 17/00; G03B 13/06; G03B 13/10
[52] U.S. Cl. .......................... 359/676; 359/683; 359/686; 359/687; 359/688; 359/729; 396/379; 396/382
[58] Field of Search .................................... 359/676, 683, 359/686, 687, 688, 729; 396/379, 382

[56] References Cited

U.S. PATENT DOCUMENTS

| | | | |
|---|---|---|---|
| 3,810,221 | 5/1974 | Plummer | 396/382 |
| 3,836,931 | 9/1974 | Plummer | 359/647 |
| 4,650,292 | 3/1987 | Baker et al. | 359/676 |
| 4,804,835 | 2/1989 | Ando | 250/201 |
| 4,925,281 | 5/1990 | Baker | 359/676 |
| 5,274,406 | 12/1993 | Tejima et al. | 353/70 |

FOREIGN PATENT DOCUMENTS

| | | |
|---|---|---|
| 0 722 106 | 11/1995 | European Pat. Off. . |
| 0 687 932 | 12/1995 | European Pat. Off. . |
| 59-84201 | 5/1984 | Japan . |
| 62-144127 | 6/1987 | Japan . |
| 8-201912 | 8/1996 | Japan . |

*Primary Examiner*—Scott J. Sugarman
*Attorney, Agent, or Firm*—Pillsbury Madison & Sutro LLP

[57] ABSTRACT

A variable-magnification image-forming optical system having at least four lens units including a decentered optical system. The decentered optical system has at least one curved surface with a rotationally asymmetric surface configuration having no axis of rotational symmetry in nor out of the surface. Rotationally asymmetric aberrations due to decentration are corrected by the rotationally asymmetric surface configuration. A magnification change is effected by changing at least one of the spacings between the four lens units.

50 Claims, 11 Drawing Sheets

FIG. 7
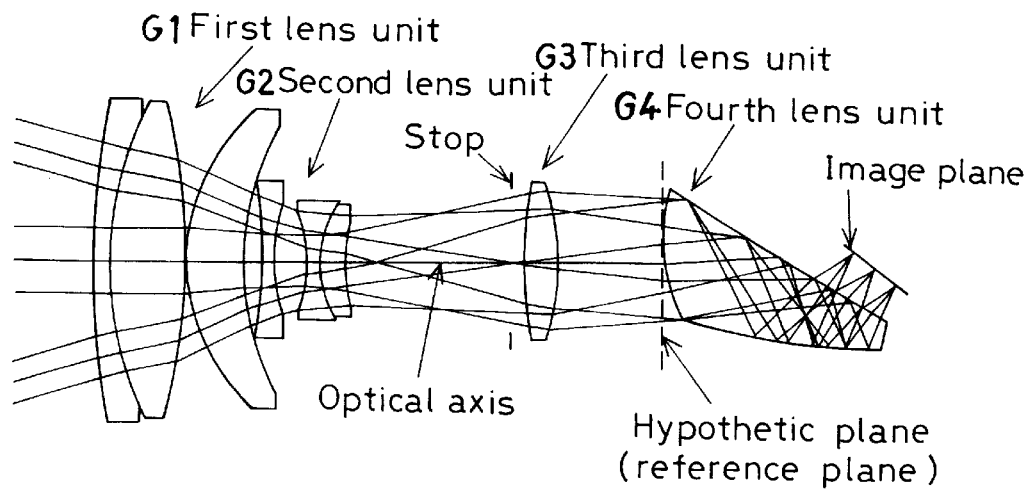
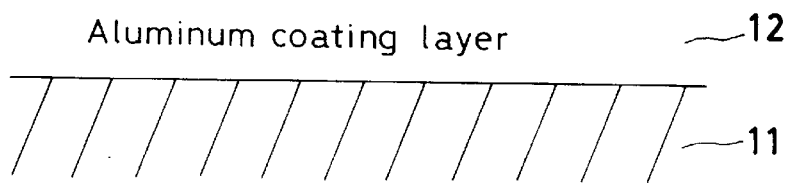
FIG. 8(a)
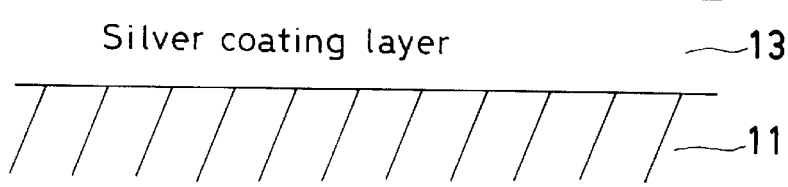
FIG. 8(b)
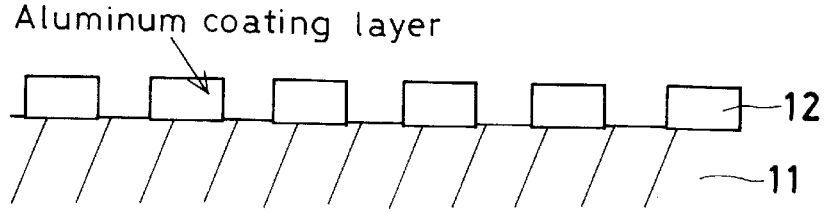
FIG. 8(c)

16 Camera   14 Taking lens   15 Finder

M

VARIABLE-MAGNIFICATION IMAGE-FORMING OPTICAL SYSTEM

BACKGROUND OF THE INVENTION

The present invention relates to a variable-magnification image-forming optical system including a zoom lens system comprising four or more lens units. More particularly, the present invention relates to a variable-magnification image-forming optical system having a zoom lens system comprising at least four lens units in which the fourth lens unit includes a non-rotationally symmetric curved surface operating to correct aberrations due to decentration.

There has heretofore been known a compact reflecting decentered optical system as disclosed in Japanese Patent Application Unexamined Publication Number [hereinafter referred to as "JP(A)"] 59-84201. This is an invention of a one-dimensional light-receiving lens comprising a cylindrical reflecting surface; therefore, two-dimensional imaging cannot be effected with this conventional optical system. JP(A) 62-144127 discloses an optical system wherein the identical cylindrical surface is used twice to effect reflection in order to reduce spherical aberration in the above-mentioned invention. JP(A) 62-205547 discloses the use of an a spherical reflecting surface as a reflecting surface, but makes no mention of the configuration of the reflecting surface.

U.S. Pat. Nos. 3,810,221 and 3,836,931 both disclose an example in which a rotationally symmetric aspherical mirror and a lens system having a surface which has only one plane of symmetry are used to constitute a finder optical system of a reflex camera. In this example, however, the surface having only one plane of symmetry is utilized for the purpose of correcting the tilt of a virtual image for observation.

JP(A) 1-257834 (U.S. Pat. No. 5,274,406) discloses an example in which a surface having only one plane of symmetry is used for a reflecting mirror to correct image distortion in a rear projection type television. In this example, however, a projection lens system is used for projection onto a screen, and the surface having only one plane of symmetry is used for correction of image distortion.

JP(A) 7-333551 discloses an example of a back-coated mirror type decentered optical system using an anamorphic surface and a toric surface as an observation optical system. However, the decentered optical system is not sufficiently corrected for aberrations, including image distortion.

None of the above-described prior arts use a surface having only one plane of symmetry as a back-coated mirror to form a folded optical path.

In the conventional rotationally symmetric optical systems, a transmitting rotationally symmetric lens having refracting power is assigned to exert the required refracting power. Therefore, many constituent elements are needed for aberration correction. In the conventional decentered optical systems, however, an imaged figure or the like is undesirably distorted and the correct shape cannot be recorded unless aberrations of the formed image are favorably corrected and, particularly, rotationally asymmetric distortion is favorably corrected.

In a rotationally symmetric optical system comprising a refracting lens which is formed from a surface rotationally symmetric about an optical axis, a straight-line optical path is formed. Therefore, the entire optical system undesirably lengthens in the direction of the optical axis, resulting in an unfavorably large-sized apparatus.

SUMMARY OF THE INVENTION

In view of the problems associated with the prior arts, an object of the present invention is to provide a variable-magnification image-forming optical system using a compact decentered optical system capable of providing a clear image of minimal distortion even at a wide field angle.

Another object of the present invention is to provide a variable-magnification optical system comprising at least four lens units including such a decentered optical system.

To attain the above-described objects, the present invention provides a variable-magnification image-forming optical system comprising a first lens unit having at least one lens; a second lens unit disposed on the image side of the first lens unit; a third lens unit disposed on the image side of the second lens unit; and a fourth lens unit disposed on the image side of the third lens unit. When zooming from a wide-angle end to a telephoto end is performed, the spacing between the first lens unit and the second lens unit and the spacing between the second lens unit and the third lens unit are varied. The fourth lens unit has at least one curved reflecting surface and a non-rotationally symmetric curved surface operating to correct non-rotationally symmetric aberrations produced by a decentering action of the curved reflecting surface.

First of all, a coordinate system used in the following description will be explained. It is assumed that a light ray passing through the center of an object point and passing through the center of a stop to reach the center of an image plane is defined as an axial principal ray. It is also assumed that an optical axis defined by a straight line along which the axial principal ray travels until it intersects the first surface of the optical system is defined as a Z-axis, and that an axis perpendicularly intersecting the Z-axis in the decentration plane of each decentered surface constituting the optical system is defined as a Y-axis, and further that an axis perpendicularly intersecting the optical axis and also perpendicularly intersecting the Y-axis is defined as an X-axis.

Ray tracing will be described by forward ray tracing in which light rays are traced from the object toward the image plane.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole. On the other hand, aspherical surfaces and the like are used to favorably effect aberration correction with a minimal number of surfaces. The reason for this is to reduce various aberrations which would be produced by spherical surfaces.

However, in a decentered optical system, rotationally asymmetric aberrations due to decentration cannot be corrected by a rotationally symmetric optical system.

The arrangement and operation of the present invention will be described below.

The basic arrangement of the present invention is as follows: A variable-magnification image-forming optical system comprises a decentered optical system including at least one curved surface with a rotationally asymmetric surface configuration having no axis of rotational symmetry in nor out of the surface, wherein rotationally asymmetric aberrations due to decentration are corrected by the rotationally asymmetric surface configuration. The variable-magnification image-forming optical system further comprises at least three positive or negative lens units.

When a rotationally symmetric optical system is decentered, rotationally asymmetric aberrations occur, and it is impossible to correct these aberrations only by a rotationally symmetric optical system. Rotationally asymmetric aberrations due to decentration include image distortion, curvature of field, and astigmatic and comatic aberrations, which occur even on the axis. FIG. 13 shows curvature of field produced by a decentered concave mirror M. FIG. 14 shows axial astigmatism produced by a decentered concave mirror M. FIG. 15 shows axial comatic aberration produced by a decentered concave mirror M. Accordingly to the present invention, a rotationally asymmetric surface is disposed in the optical system to correct such rotationally asymmetric aberrations due to decentration.

Rotationally asymmetric aberrations produced by the decentered concave mirror M include rotationally asymmetric curvature of field such as that shown in FIG. 13. For example, when light rays from an infinitely distant object point are incident on the decentered concave mirror M, the light rays are reflected by the concave mirror M to form an image. In this case, the back focal length from that portion of the concave mirror M on which the light rays strike to the image surface is a half the curvature of the portion on which the light rays strike. Consequently, an image surface tilted with respect to the axial principal ray is formed as shown in FIG. 13. It has heretofore been impossible to correct such rotationally asymmetric curvature of field by a rotationally symmetric optical system. The tilted curvature of field can be corrected by forming the concave mirror M from a rotationally asymmetric surface, and, in this example, arranging it such that the curvature is made strong (refracting power is increased) in the positive Y-axis direction (the upward direction in the figure), whereas the curvature is made weak (refracting power is reduced) in the negative Y-axis direction. It is also possible to obtain a flat image surface with a minimal number of constituent surfaces by disposing a rotationally asymmetric surface having the same effect as that of the above-described arrangement in the optical system separately from the concave mirror M.

Next, rotationally asymmetric astigmatism will be explained. A decentered concave mirror M produces astigmatism even for axial rays, as shown in FIG. 14, as in the case of the above. The astigmatism can be corrected by appropriately changing the curvatures in the X- and Y-axis directions of the rotationally asymmetric surface as in the case of the above.

Rotationally asymmetric coma will be explained below. A decentered concave mirror M produces coma even for axial rays, as shown in FIG. 15, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

In the above-described basic arrangement of the present invention, if the decentered optical system is formed by using a folded optical path, it is possible to impart power to the reflecting surface and hence possible to omit a transmission lens. Moreover, because the optical path is folded, the optical system can be formed in a compact structure.

By adding at least three lens units comprising positive or negative optical systems to the decentered optical system, the principal point can be positioned in front of or behind the variable-magnification image-forming optical system, i.e. on the object or image side thereof. In other words, addition of at least three optical systems makes it possible to construct an even more compact image-forming optical system.

The present invention includes an image-forming optical system comprising a lens unit having a decentered optical system which has at least one curved surface with a rotationally asymmetric surface configuration having no axis of rotational symmetry in nor out of the surface and in which rotationally asymmetric aberrations due to decentration are corrected by the rotationally asymmetric surface configuration, and at least three other lens units, wherein a magnification change is effected by changing at least one of the spacings between the four lens units.

According to the present invention, a magnification change is effected by changing at least one of the spacings between a total of at least four lens units, i.e. a lens unit having the decentered optical system and at least three other optical systems. With this arrangement, it becomes possible to construct a compact variable-magnification optical system.

It is preferable that at least one spacing between certain lens units should be varied by using a unit-spacing varying device that varies the spacing between the lens units by moving at least one lens unit in the direction of the axial principal ray. It is also possible to effect focusing by moving a part or all of the at least four lens units.

The above-described non-rotationally symmetric curved surface must be a surface capable of operating to correct non-rotationally symmetric aberration due to decentration. Toric surfaces, anamorphic surfaces, etc. fall under this category. Of these several types of non-rotationally symmetric curved surfaces, plane-symmetry three-dimensional surfaces having only one plane of symmetry can correct decentration aberrations most appropriately. One form of such three-dimensional surfaces is shown by way of example in FIG. 16. A surface p in FIG. 16 has a non-rotationally symmetric curved surface configuration. The surface p has symmetry with respect to a hypothetic plane q. Unlike toric surfaces and anamorphic surfaces, the surface p has no plane of symmetry other than the plane q. Accordingly, a surface having such a configuration is referred to as "a plane-symmetry three-dimensional surface p having only one plane q of symmetry".

In design, such a three-dimensional surface may be defined by the following equation:

$$Z = C_2 + C_3 y + C_4 x + C_5 y^2 + C_6 yx + C_7 x^2 + C_8 y^3 + \quad (a)$$
$$C_9 y^2 x + C_{10} yx^2 + C_{11} x^3 + C_{12} y^4 + C_{13} y^3 x + C_{14} y^2 x^2 +$$
$$C_{15} yx^3 + C_{16} x^4 C_{17} y^5 + C_{18} y^4 x + C_{19} y^3 x^2 + C_{20} y^2 x^3 +$$
$$C_{21} yx^4 + C_{22} x^5 + C_{23} y^6 + C_{24} y^5 x + C_{25} y^4 x^2 + C_{26} y^3 x^3 +$$
$$C_{27} y^2 x^4 + C_{28} yx^5 + C_{29} x^6 + C_{30} y^7 + C_{31} y^6 x + C_{32} y^5 x^2 +$$
$$C_{33} y^4 x^3 + C_{34} y^3 x^4 + C_{35} y^2 x^5 + C_{36} yx^6 + C_{37} x^7$$

where $C_m$ (m is an integer of 2 or higher) are coefficients.

In general, the above-described three-dimensional surface does not have planes of symmetry in both the XZ- and YZ-planes. In the present invention, a three-dimensional surface having only one plane of symmetry parallel to the YZ-plane is obtained by making all terms with odd-numbered powers of x zero. For example, in the above defining equation (a), the coefficients of the terms $C_4$, $C_6$, $C_9$, $C_{11}$, $C_{13}$, $C_{15}$, $C_{18}$, $C_{20}$, $C_{22}$, $C_{24}$, $C_{26}$, $C_{28}$, $C_{31}$, $C_{33}$, $C_{35}$, $C_{37}$, . . . are set equal to zero. By doing so, it is possible to obtain a three-dimensional surface having only one plane of symmetry parallel to the YZ-plane.

A three-dimensional surface having only one plane of symmetry parallel to the XZ-plane is obtained by making all terms with odd-numbered powers of y zero. For example, in the above defining equation (a), the coefficients of the terms $C_3$, $C_6$, $C_8$, $C_{10}$, $C_{13}$, $C_{15}$, $C_{17}$, $C_{19}$, $C_{21}$, $C_{24}$, $C_{26}$, $C_{28}$, $C_{30}$, $C_{32}$, $C_{34}$, $C_{36}$, . . . are set equal to zero. By doing so, it is possible to obtain a three-dimensional surface having only one plane of symmetry parallel to the XZ-plane. The use of a three-dimensional surface having such a plane of symmetry makes it possible to improve the productivity.

Rotationally asymmetric aberrations due to decentration can be effectively corrected by using a three-dimensional surface having either a plane of symmetry parallel to the YZ-plane or a plane of symmetry parallel to the XZ-plane.

It should be noted that the above defining equation is shown as merely an example, and that the feature of the present invention resides in that rotationally asymmetric aberrations due to decentration are corrected by a rotationally asymmetric surface having only one plane of symmetry. Therefore, the same advantageous effect can be obtained for any other defining equation.

It is desirable that the plane of symmetry of the rotationally asymmetric surface should be approximately coincident with the plane of decentration of each decentered surface constituting the decentered optical system.

If the rotationally asymmetric surface is a three-dimensional surface which is disposed in the decentered optical system and which has a plane of symmetry approximately coincident with the decentration plane of each decentered surface, both sides of the plane of symmetry can be made symmetric. This makes it possible to favorably effect aberration correction and to improve the productivity to a considerable extent.

It is desirable for the decentered optical system to have a reflecting surface having totally reflecting action or reflecting action. If the reflecting surface is a totally reflecting surface tilted with respect to light rays so that the light rays are incident thereon at an angle exceeding the critical angle, a high reflectivity can be obtained. The reflecting surface is preferably a reflecting surface having a thin film of a metal, e.g. aluminum or silver, formed thereon, or a reflecting surface formed from a dielectric multilayer film. In the case of a metal thin film having reflecting action, a high reflectivity can be readily obtained. The use of a dielectric reflecting film is advantageous in a case where a reflecting film having wavelength selectivity or a semitransparent surface or a reflecting film having minimal absorption is to be formed.

It is also desirable to use the rotationally asymmetric surface having only one plane of symmetry as a reflecting surface. If such a three-dimensional surface is formed as a reflecting surface, aberration correction can be made favorably. If a rotationally asymmetric surface is used as a reflecting surface, no chromatic aberration occurs in contrast to a case where it is used as a transmitting surface. Moreover, even if the tilt of the surface is small, the surface can bend light rays. Accordingly, the amount of other aberration produced by the surface is also small. In other words, when the same refracting power is to be obtained, the amount of aberration produced by a reflecting surface is smaller than by a refracting surface.

In this case, it is desirable to use the rotationally asymmetric surface having only one plane of symmetry as a back-coated mirror. By forming the above-described reflecting surface from a back-coated mirror, curvature of field can be reduced. The reason for this is as follows: When concave mirrors of the same focal length are to be formed from a back-coated mirror and a surface-coated mirror, respectively, the back-coated mirror can have a greater radius of curvature by an amount corresponding to the refractive index and thus produces a smaller amount of aberration, particularly curvature of field.

Assuming that in the above-described decentered optical system a light ray emanating from the center of an object point and passing through the center of a pupil to reach the center of an image is defined as an axial principal ray, it is desirable that the rotationally asymmetric surface should be tilted with respect to the axial principal ray. If the rotationally asymmetric surface is tilted with respect to the axial principal ray, it is possible to correct decentration aberrations even more effectively. In particular, when the reflecting surface has power, it is possible to correct comatic aberration and astigmatism produced by another surface owing to decentration.

It is important to satisfy the following condition:

$$1° < |\alpha| \qquad (1\text{-}1)$$

where $\alpha$ is an angle formed between the axial principal ray and a line normal to the rotationally asymmetric surface at a point where the axial principal ray intersects the rotationally asymmetric surface.

If $|\alpha|$ is not larger than the lower limit of the condition (1-1), i.e. 1°, it becomes impossible for this surface to correct comatic aberration and astigmatism produced by another surface owing to decentration. Consequently, resolution degrades even for an image on the axis.

It is preferable from the viewpoint of aberration correction to satisfy the following condition:

$$10° < |\alpha| < 80° \qquad (1\text{-}2)$$

It is necessary for $|\alpha|$ to be larger than the lower limit of the condition (1-2), i.e. 10°, in order to correct aberrations produced by another surface. If $|\alpha|$ is not smaller than the upper limit of the condition (1-2), i.e. 80°, comatic aberration and astigmatism produced by this surface owing to decentration become excessively large, resulting in over correction. Accordingly, it becomes difficult to balance decentration aberrations with each other.

It is even more desirable for the above $\alpha$ to satisfy the following condition:

$$10° < |\alpha| < 60° \qquad (1\text{-}3)$$

By satisfying the condition (1-3), the aberration correcting performance is further improved.

Assuming that a light ray emanating from the center of an object point and passing through the center of a pupil to reach the center of an image is defined as an axial principal ray, and that a Y-axis is taken in the plane of decentration of each decentered surface, and an X-axis is taken in a direction perpendicularly intersecting the Y-axis, and further that an axis constituting an orthogonal coordinate system in combination with the X- and Y-axes is defined as a Z-axis, it is desirable to satisfy the following condition:

$$0.00001 < |DY| < 0.1 \qquad (2\text{-}1)$$

where DY denotes a difference between the value of the tangent of a line normal to at least one rotationally asymmetric surface in the YZ-plane at a position where a principal ray at the maximum field angle in the direction of the X-axis impinges on the surface and the value of the tangent of a line normal to the surface in the YZ-plane at a position where the axial principal ray impinges on the surface.

The condition (2-1) relates to a bow-shaped rotationally asymmetric image distortion in which a horizontal line, for example, is undesirably curved in a bow shape when imaged. Assuming that, as shown in the perspective view of FIG. 18(a) and FIG. 18(b), which is a projection of FIG. 18(a) onto the YZ-plane, DY denotes the difference between the value of the tangent in the YZ-plane of a line n' normal to a rotationally asymmetric surface A at a point where a principal ray at the maximum field angle in the direction X intersects the rotationally asymmetric surface A and the value of the tangent in the YZ-plane of a line n normal to the rotationally asymmetric surface A at a point where the axial principal ray intersects the rotationally asymmetric surface A, it is important to satisfy the condition (2-1). If |DY| is not larger than the lower limit of the condition (2-1), i.e. 0.00001, it becomes impossible to correct a bow-shaped image distortion. If |DY| is not smaller than the upper limit, i.e. 0.1, a bow-shaped image distortion is over-corrected. In either case, the image is distorted in a bow shape.

It is more desirable to satisfy the following condition:

$$0.00001 < |DY| < 0.05 \tag{2-2}$$

Assuming that a Y-axis is taken in the plane of decentration of each decentered surface, and an X-axis is taken in a direction perpendicularly intersecting the Y-axis, and that an axis constituting an orthogonal coordinate system in combination with the X- and Y-axes is defined as a Z-axis, it is desirable to satisfy the following condition (3-1) or (3-2):

$$0 < |Cxn| < 1 \tag{3-1}$$

$$1 < |Cxn| < 10 \tag{3-2}$$

where Cxn denotes the ratio between the curvature in the X-axis direction of a portion of at least one rotationally asymmetric surface at which a principal ray at the maximum field angle in the positive direction of the Y-axis in the decentration plane (YZ-plane) impinges on the surface and the curvature in the X-axis direction of a portion of the surface at which a principal ray at the maximum field angle in the negative direction of the Y-axis impinges on the surface.

The conditions (3-1) and (3-2) relate to a trapezoidal image distortion. If |Cxn| is not larger than the lower limit of the condition (3-1), i.e. 0, when this surface reflects light rays in the positive direction of the Y-axis, a trapezoidal distortion in which the upside of a trapezoid becomes shorter in the negative direction of the Y-axis becomes excessively large and impossible to correct by another surface. If |Cxn| is not smaller than the upper limit of the condition (3-2), i.e. 10, a trapezoidal distortion in which the upside of a trapezoid becomes shorter in the positive direction of the Y-axis in reverse relation to the above occurs to a considerable extent and becomes difficult to correct by another surface. When Cxn is 1, a trapezoidal distortion produced by this surface cannot be reduced, but it is left uncorrected. In other words, it is important that Cxn should assume a value within the range defined by the condition (3-1) or (3-2), exclusive of 1, to cancel the image distortion with good balance with another surface.

It is more desirable to satisfy the following condition (3-3) or (3-4):

$$0.8 < |Cxn| < 1 \tag{3-3}$$

$$1 < |Cxn| < 3 \tag{3-4}$$

In the image-forming optical system (hereinafter referred to as "zoom lens system") according to the present invention, in which a magnification change is effected by changing at least one of the spacings between the four lens units, it is desirable to satisfy the following condition:

$$0.01 < |Fg1/Fg2| < 100 \tag{4-1}$$

where Fg1 is the focal length of the first lens unit, and Fg2 is the focal length of the second lens unit.

The condition (4-1) is important to satisfy in a case where a variable-magnification optical system is constructed by using the image-forming optical system according to the present invention. If |Fg1/Fg2| is not larger than the lower limit of the condition (4-1), i.e. 0.01, the focal length of the second lens unit becomes excessively long. If |Fg1/Fg2| is not smaller than the upper limit, i.e. 100, the focal length of the first lens unit becomes excessively long. In either case, it becomes difficult to attain a high zoom ratio, and the overall length of the optical system becomes undesirably long.

It is even more desirable from the viewpoint of aberration correction and shortening the overall length of the optical system to satisfy the following condition:

$$0.01 < |Fg1/Fg2| < 20 \tag{4-2}$$

In the zoom lens system according to the present invention, in which a magnification change is effected by changing at least one of the spacings between the four lens units, it is important to satisfy the following condition:

$$0.01 < |Fg1/Fg3| < 100 \tag{5-1}$$

where Fg1 is the focal length of the first lens unit, and Fg3 is the focal length of the third lens unit.

If |Fg1/Fg3| is not larger than the lower limit of the condition (5-1), i.e. 0.01, the focal length of the third lens unit becomes excessively long. If |Fg1/Fg3| is not smaller than the upper limit, i.e. 100, the focal length of the first lens unit becomes excessively long. In either case, it becomes difficult to attain a high zoom ratio, and the overall length of the optical system becomes undesirably long.

It is even more desirable from the viewpoint of aberration correction and shortening the overall length of the optical system to satisfy the following condition:

$$0.01 < |Fg1/Fg3| < 20 \tag{5-2}$$

In the zoom lens system according to the present invention, in which a magnification change is effected by changing at least one of the spacings between the four lens units, it is important to satisfy the following condition:

$$0.01 < |Fg1/Fx| < 100 \tag{6-1}$$

where Fg1 is the focal length of the first lens unit, and Fx is the focal length of the entire optical system with respect to a light ray in the X direction, which is perpendicular to the plane of decentration of each decentered surface.

If |Fg1/Fx| is not larger than the lower limit of the condition (6-1), i.e. 0.01, the focal length of the first lens unit becomes excessively short, and spherical and comatic aberrations produced by the first lens unit become excessively large and difficult to correct by another lens unit. If |Fg1/Fx| is not smaller than the upper limit, i.e. 100, the focal length of the first lens unit becomes excessively long. Consequently, it becomes difficult to attain a high zoom ratio, and the overall length of the optical system becomes undesirably long.

It is even more desirable to satisfy the following condition:

$$0.1 < |Fg1/Fx| < 20 \quad (6\text{-}2)$$

In the zoom lens system according to the present invention, in which a magnification change is effected by changing at least one of the spacings between the four lens units, it is important to satisfy the following condition:

$$0.001 < |Fg2/Fx| < 1000 \quad (7\text{-}1)$$

where Fg2 is the focal length of the second lens unit, and Fx is the focal length of the entire optical system with respect to a light ray in the X direction, which is perpendicular to the plane of decentration of each decentered surface.

If $|Fg2/Fx|$ is not larger than the lower limit of the condition (7-1), i.e. 0.001, the focal length of the second lens unit becomes excessively short, and spherical and comatic aberrations produced by the second lens unit become excessively large and difficult to correct by another lens unit. If $|Fg2/Fx|$ is not smaller than the upper limit, i.e. 1000, the focal length of the second lens unit becomes excessively long. Consequently, it becomes difficult to attain a high zoom ratio, and the overall length of the optical system becomes undesirably long.

It is even more desirable to satisfy the following condition:

$$0.1 < |Fg2/Fx| < 100 \quad (7\text{-}2)$$

In the zoom lens system according to the present invention, in which a magnification change is effected by changing at least one of the spacings between the four lens units, it is important to satisfy the following condition:

$$0.01 < |Fg3/Fx| < 1000 \quad (8\text{-}1)$$

where Fg3 is the focal length of the third lens unit, and Fx is the focal length of the entire optical system with respect to a light ray in the X direction, which is perpendicular to the plane of decentration of each decentered surface.

If $|Fg3/Fx|$ is not larger than the lower limit of the condition (8-1), i.e. 0.01, the focal length of the third lens unit becomes excessively short, and spherical and comatic aberrations produced by the third lens unit become excessively large and difficult to correct by another lens unit. If $|Fg3/Fx|$ is not smaller than the upper limit, i.e. 1000, the focal length of the third lens unit becomes excessively long. Consequently, it becomes difficult to attain a high zoom ratio, and the overall length of the optical system becomes undesirably long.

It is even more desirable to satisfy the following condition:

$$0.1 < |Fg3/Fx| < 100 \quad (8\text{-}2)$$

Assuming that a light ray emanating from the center of an object point and passing through the center of a pupil to reach the center of an image is defined as an axial principal ray, and that a Y-axis is taken in the plane of decentration of each decentered surface, and an X-axis is taken in a direction perpendicularly intersecting the Y-axis, and further an axis constituting an orthogonal coordinate system in combination with the X- and Y-axes is defined as a Z-axis, and further that the axial principal ray and a light ray which is parallel to the axial principal ray at a slight distance d in the X-axis direction are made to enter the entire optical system from the entrance side thereof, and the sine of an angle formed between the two rays as projected on the XZ-plane at the exit side of the optical system is denoted by NA'X, and further that a value obtained by dividing NA'X by the distance d between the parallel rays is denoted by Px, and the power in the X-axis direction of that portion of the rotationally asymmetric surface on which the axial principal ray strikes is denoted by Pxn, it is desirable to satisfy the following condition:

$$0.0001 < |Pxn/Px| < 1000 \quad (9\text{-}1)$$

The power of a rotationally asymmetric surface in the optical system according to the present invention will be described below. As shown in FIG. 17, when the direction of decentration of an optical system S is taken in the Y-axis direction, the axial principal ray in the optical system S including a lens system comprising a first to third lens units and a light ray which is parallel to the axial principal ray and which has a height d in the YZ-plane are made to enter the optical system S from the object side thereof, and the sine of an angle formed between the two rays as projected on the YZ-plane at the exit side of the optical system S is denoted by NA'Y. Further, NA'Y/d is defined as the power Py in the Y direction of the entire optical system. The power in the X direction of the entire optical system is similarly defined and denoted by Px. Further, the power in the X-axis direction of that portion of a specific rotationally asymmetric surface A according to the present invention on which the axial principal ray strikes is denoted by Pxn. Under these conditions, it is preferable from the viewpoint of aberration correction to satisfy the condition (9-1). If $|Pxn/Px|$ is not smaller than the upper limit of the condition (9-1), i.e. 1000, the power of the rotationally asymmetric surface becomes excessively stronger than the power of the entire optical system. Consequently, the rotationally asymmetric surface has excessively strong refracting power, and aberrations produced by the rotationally asymmetric surface become impossible to correct by another surface. If $|Pxn/Px|$ is not larger than the lower limit, i.e. 0.0001, the entire optical system becomes undesirably large in size.

It is more desirable from the viewpoint of aberration correction that Pxn/Px should satisfy the following condition:

$$0.001 < |Pxn/Px| < 100 \quad (9\text{-}2)$$

By satisfying the condition (9-2), rotationally asymmetric aberrations can be corrected even more favorably.

It is still more desirable from the viewpoint of aberration correction that Pxn/Px should satisfy the following condition:

$$0.001 < |Pxn/Px| < 10 \quad (9\text{-}3)$$

By satisfying the condition (9-3), rotationally asymmetric aberrations can be corrected even more favorably.

Assuming that a light ray emanating from the center of an object point and passing through the center of a pupil to reach the center of an image is defined as an axial principal ray, and that a Y-axis is taken in the plane of decentration of each decentered surface, and an X-axis is taken in a direction perpendicularly intersecting the Y-axis, and further an axis constituting an orthogonal coordinate system in combination with the X- and Y-axes is defined as a Z-axis, and further that the axial principal ray and a light ray which is parallel to the axial principal ray at a slight distance d in the Y-axis direction are made to enter the entire optical system from the entrance side thereof, and the sine of an angle formed between the two rays as projected on the YZ-plane at the exit side of the optical system is denoted by NA'Y, and further that a value obtained by dividing NA'Y by the distance d between the parallel rays is denoted by Py, and the power in the Y-axis direction of that portion of the rotationally asymmetric surface on which the axial principal ray strikes is denoted by Pyn, it is desirable to satisfy the following condition:

$$0.0001 < |Pyn/Py| < 1000 \quad (10\text{-}1)$$

When the power in the Y direction of the entire optical system is similarly defined and denoted by Py, it is preferable from the viewpoint of aberration correction to satisfy the condition (10-1). If $|Pyn/Py|$ is not smaller than the upper limit of the condition (10-1), i.e. 1000, the power of the rotationally asymmetric surface becomes excessively stronger than the power of the entire optical system. Consequently, the rotationally asymmetric surface has excessively strong refracting power, and aberrations produced by the rotationally asymmetric surface become impossible to correct by another surface. If $|Pyn/Py|$ is not larger than the lower limit, i.e. 0.0001, the entire optical system becomes undesirably large in size.

It is more desirable from the viewpoint of aberration correction that Pyn/Py should satisfy the following condition:

$$0.001 < |Pyn/Py| < 100 \quad (10\text{-}2)$$

By satisfying the condition (10-2), rotationally asymmetric aberrations can be corrected even more favorably.

It is still more desirable from the viewpoint of aberration correction that Pyn/Py should satisfy the following condition:

$$0.001 < |Pyn/Py| < 10 \quad (10\text{-}3)$$

By satisfying the condition (10-3), rotationally asymmetric aberrations can be corrected even more favorably.

Assuming that Px/Py denotes the ratio of the power Px in the X direction of the entire optical system to the power Py in the Y direction of the entire optical system, it is desirable from the viewpoint of aberration correction to satisfy the following condition:

$$0.1 < Px/Py < 10 \quad (11\text{-}1)$$

If Px/Py is not larger than the lower limit of the condition (11-1), i.e. 0.1, or not smaller than the upper limit, i.e. 10, the focal lengths in the directions X and Y of the entire optical system become excessively different from each other, and it becomes difficult to favorably correct the image distortion. Consequently, the image is undesirably distorted.

It is more desirable from the viewpoint of aberration correction that Px/Py should satisfy the following condition:

$$0.5 < Px/Py < 2 \quad (11\text{-}2)$$

By satisfying the condition (11-2), rotationally asymmetric aberration can be corrected even more favorably.

It is still more desirable from the viewpoint of aberration correction that Px/Py should satisfy the following condition:

$$0.8 < Px/Py < 1.2 \quad (11\text{-}3)$$

By satisfying the condition (11-3), rotationally asymmetric aberration can be corrected even more favorably.

The decentered optical system may comprise only a first reflecting surface, wherein light rays are reflected by the first reflecting surface in a direction different from a direction in which the light rays are incident thereon. If the first reflecting surface is tilted with respect to the axial principal ray, aberrations due to decentration are produced when light rays are reflected at the surface. Rotationally asymmetric aberrations due to decentration can be satisfactorily corrected by forming the reflecting surface from a rotationally asymmetric surface. If the reflecting surface is not formed from a rotationally asymmetric surface, rotationally asymmetric aberrations occur to a considerable extent, causing resolution to be degraded. Further, aberration correction can be made even more effectively by satisfying the above conditions (1-1) to (11-3).

The decentered optical system may comprise a first reflecting surface and a first transmitting surface, wherein light rays enter the optical system through the first transmitting surface and are reflected by the first reflecting surface to exit from the optical system through the first transmitting surface in a direction different from a direction in which the light rays are incident on the first transmitting surface. By adding one transmitting surface, the Petzval sum of the optical system can be reduced. In the case of transmitting and reflecting surfaces of positive power, Petzval curvatures cancel each other. Accordingly, power can be dispersed, and the Petzval sum can be reduced. Thus, it becomes possible to correct curvature of field. It is preferable from the viewpoint of favorably correcting field curvature that the first transmitting surface and the first reflecting surface should have powers of the same sign at their axial principal ray transmitting and reflecting regions.

The decentered optical system may comprise a first reflecting surface, a first transmitting surface, and a second transmitting surface, wherein light rays enter the optical system through the first transmitting surface and are reflected by the first reflecting surface to exit from the optical system through the second transmitting surface in a direction different from a direction in which the light rays are incident on the first transmitting surface. By dividing the above-described first transmitting surface into two surfaces, i.e. a surface through which light rays enter the optical system, and a surface through which light rays exit from the optical system, curvature of field can be corrected even more favorably. In a case where the first transmitting surface is a lens having a positive power with respect to transmitted light, it is possible to suppress divergence of light rays at the first reflecting surface and hence possible to reduce the size of the first reflecting surface. If the optical system is arranged such that light rays travel successively via the first transmitting surface, the first reflecting surface and the second transmitting surface, it is possible to form the first reflecting surface from a back-coated mirror. If the first reflecting surface is formed from a back-coated mirror, curvature of field can be corrected more favorably than in the case of a surface-coated mirror. If either or both of the first and second transmitting surfaces are given power of the same sign as that of the first reflecting surface, curvature of field can be corrected approximately completely.

On the other hand, if the powers of the first and second transmitting surfaces are made approximately zero, favorable effects can be produced on chromatic aberrations. That is, the first reflecting surface produces no chromatic aberration in theory and hence need not correct chromatic aberration with another surface. Therefore, the powers of the first and second transmitting surfaces are made approximately zero so that no chromatic aberration is produced by these surfaces. This makes it possible to construct an optical system having minimal chromatic aberration as a whole.

The decentered optical system may comprise a first reflecting surface, a second reflecting surface, and a first transmitting surface, wherein light rays enter the optical system through the first transmitting surface and are reflected by the first reflecting surface and then reflected by the second reflecting surface to exit from the optical system through the first transmitting surface. If the decentered optical system comprises a pair of first and second reflecting surfaces and a first transmitting surface, the optical axis can be folded by the two reflecting surfaces. This enables a reduction in the size of the optical system. Moreover, because reflection takes place an even number of times, an image can be formed without being reversed. Further, it is possible to vary the powers of the two reflecting surfaces. Accordingly, the principal point can be positioned in front of or behind the optical system by using a combination of a positive power and a negative power or a combination of a negative power and a positive power. This also makes it possible to produce favorable effects on the curvature of field. Furthermore, it is also possible to substantially eliminate field curvature by forming the two reflecting surfaces from back-coated mirrors.

The decentered optical system may comprise a first reflecting surface, a second reflecting surface, a first transmitting surface, and a second transmitting surface, wherein light rays enter the optical system through the first transmitting surface and are reflected by the first reflecting surface and then reflected by the second reflecting surface to exit from the optical system through the second transmitting surface. If the decentered optical system comprises a pair of first and second reflecting surfaces and a pair of first and second transmitting surfaces, the optical axis can be folded by the two reflecting surfaces, and thus the optical system can be constructed in a compact form. Moreover, the presence of two transmitting surfaces makes it possible to produce even more favorable effects on the principal point position and the curvature of field. Furthermore, even more favorable aberration correcting performance can be obtained by forming the two reflecting surfaces from back-coated mirrors.

In a case where the decentered optical system comprise a first reflecting surface, a second reflecting surface, a first transmitting surface, and a second transmitting surface as described above, the reflecting surfaces may be disposed such that the principal rays and reflected rays thereof substantially intersect each other in the decentered optical system. By virtue of this arrangement, the decentered optical system can be constructed in a compact form. The arrangement makes it possible to dispose the object and image planes approximately perpendicular to each other. Accordingly, the optical system and an image pickup device, which is disposed at the image-formation position, can be disposed approximately parallel to each other. Thus, an imaging optical system of low height can be constructed.

In the above-described case, the reflecting surfaces may be disposed such that the principal rays and reflected rays thereof do not substantially intersect each other. If the optical system is arranged such that no portions of the axial principal optical path intersect each other, a Z-shaped optical path can be formed. Consequently, the angle of decentration at each reflecting surface can be reduced, and the amount of aberration due to decentration can be reduced. Therefore, the arrangement is favorable from the viewpoint of correcting aberrations due to decentration. Further, the optical path from the object to the optical system and the optical path from the optical system to the image plane can be disposed approximately parallel to each other. In particular, when the optical system is used as an observation optical system or an ocular optical system, the direction for observation of an object and the direction for observation through the optical system are identical with each other. Accordingly, it is possible to make observation without feeling incongruous.

In a case where the reflecting surfaces are disposed such that the principal rays and reflected rays thereof do not substantially intersect each other, the first transmitting surface and second reflecting surface of the decentered optical system may be the identical surface. If the first transmitting surface and the second reflecting surface are the identical surface, the number of surfaces to be formed is three. Accordingly, the productivity of the optical system improves.

In the above-described case, the first reflecting surface and second transmitting surface of the decentered optical system may be the identical surface. If the first reflecting surface and the second transmitting surface are the identical surface, the number of surfaces to be formed is three. Accordingly, the productivity of the optical system improves.

The decentered optical system may comprise a first reflecting surface, a second reflecting surface, a third reflecting surface, a first transmitting surface, and a second transmitting surface, wherein light rays enter the optical system through the first transmitting surface and are reflected successively by the first, second and third reflecting surfaces to exit from the optical system through the second transmitting surface in a direction different from a direction in which the light rays are incident on the first transmitting surface. If the decentered optical system comprises three reflecting surfaces and two transmitting surfaces, the degree of freedom further increases, which is favorable from the viewpoint of aberration correction.

In this case, the first transmitting surface and second reflecting surface of the decentered optical system may be the identical surface. Alternatively, the first reflecting surface and third reflecting surface of the decentered optical system may be the identical surface. Alternatively, the second transmitting surface and second reflecting surface of the decentered optical system may be the identical surface. By forming at least two surfaces from the identical surface in this way, the productivity of the optical system improves.

Any of the above-described image-forming optical systems can be used as an image-forming optical system for a camera finder. If a rotationally asymmetric surface is used in an image-forming optical system of a camera finder optical system, favorable effects can be produced on chromatic aberrations as well as image distortion. It is preferable to use a rotationally asymmetric surface as a back-coated mirror. By doing so, aberrations can be minimized.

Any of the above-described image-forming optical systems can be used in a camera finder optical system. It is preferable to use rotationally asymmetric surfaces to form an image-forming optical system and ocular optical system of a camera finder optical system. By doing so, it is possible to provide a finder optical system which is compact in size and has minimal aberrations. It is preferable to use a rotationally asymmetric surface as a back-coated mirror and to construct a reflecting surface of an inversion prism as a back-coated mirror. By doing so, it is possible to provide a finder optical system having a reduced number of constituent elements.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 7 is a sectional view showing a zoom lens system according to Example 7 at a wide-angle end thereof.

FIGS. 8(a), 8(b) and 8(c) show examples of arrangements of surfaces having reflecting action used in a decentered optical system according to the present invention.

DESCRIPTION OF THE PREFERRED EMBODIMENTS

Examples 1 to 7 of the image-forming optical system according to the present invention in which the optical system is arranged as a zoom lens system will be described below.

Figure 1:
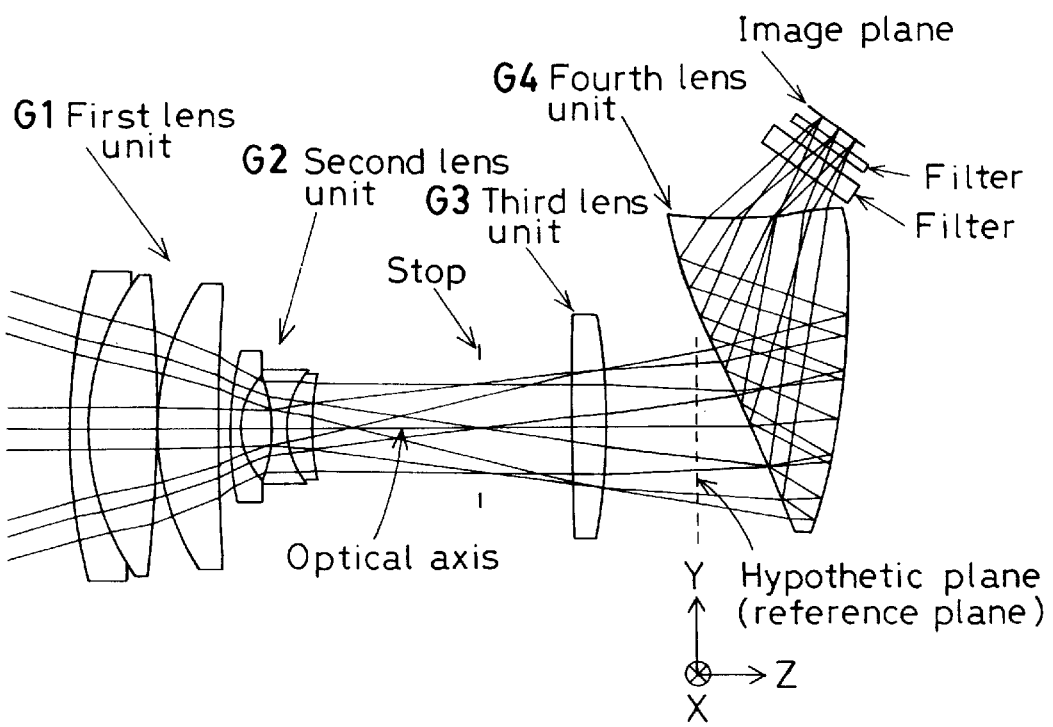
FIG. 1 is a sectional view of Example 1 in which an image-forming optical system according to the present invention is arranged as a zoom lens system, showing the zoom lens system at a wide-angle end thereof.

In constituent parameters of Examples 1 to 4 and 7 (described later), coordinates of decentered surfaces are taken as follows: As shown in FIG. 1, the center of a reference plane is defined as the origin, and an optical axis is defined by a light ray emanating from the center of an object (not shown) and passing through the center of a stop to reach the center of an image. A direction in which the light ray travels along the optical axis until it reaches the first surface of a decentered optical system (fourth lens unit G4) is defined as a Z-axis direction. The direction of an axis perpendicularly intersecting the Z-axis through the origin in a plane in which the optical axis is folded by the decentered optical system (fourth lens unit G4) is defined as a Y-axis direction. The direction of an axis perpendicularly intersecting both the Z- and Y-axes through the origin is defined as an X-axis direction. A direction in which the Z-axis extends from the object point to the first surface of the optical system is defined as a positive direction of the Z-axis. A direction in which the X-axis extends from the obverse side to the reverse side of the plane of the figure is defined as a positive direction of the X-axis. The X-, Y- and Z-axes constitute a right-handed orthogonal coordinate system. Regarding each surface for which displacements Y and Z and a tilt angle $\theta$ are shown, the displacement Y is an amount of displacement in the Y direction of the vertex of the surface from the origin, and the displacement Z is an amount of displacement in the Z direction of the vertex of the surface from the origin. The tilt angle e is an amount of rotation from the Z-axis direction of the center axis of an equation defining the surface. It should be noted that, regarding the tilt angle, the counterclockwise direction is defined as a positive direction. Surface Nos. are given according to the order in which light rays travel. Regarding a coaxial portion (first lens unit G1 to third lens unit G3), the radius of curvature of each surface, surface separation between each surface and the subsequent surface, and the refractive index and Abbe's number at the back of each surface are given according to the conventional method.

Regarding Examples 5 and 6 (described later), surface Nos. are given according to the order in which light rays travel. Parameters, exclusive of the tilt angle $\theta$ of each surface, are given according to the conventional notation for a coaxial system. Regarding each surface for which a tilt angle $\theta$ is shown, an amount of rotation of the center axis of an equation defining the surface from the optical axis incident on the surface is shown as a tilt angle $\theta$. It should be noted that, regarding the tilt angle, the counterclockwise direction is defined as a positive direction.

Three-dimensional surfaces are polynomial surfaces expressed by the above equation (a). It should be noted that the Z-axis of the defining equation (a) is the axis of a three-dimensional surface.

In the constituent parameters (described later), those coefficients concerning aspherical surfaces for which no data is shown are zero. The refractive index of a medium between surfaces is expressed by the refractive index for the spectral d-line (wavelength: 587.56 nanometers). Lengths are given in millimeters. Regarding the variable surface separation, power and focal length; W denotes a wide-angle end; S denotes a standard position; and T denotes a telephoto end. In addition, Fx is the focal length in the X direction of the entire optical system; Fy is the focal length in the Y direction of the entire optical system; Fxw is the focal length of the entire optical system at the wide-angle end; and Fxt is the focal length of the entire optical system at the telephoto end.

Three-dimensional surfaces may also be defined by Zernike polynomials. That is, the configuration of a three-dimensional surface may be defined by the following equation (b). The Z-axis of the defining equation (b) is the axis of Zernike polynomial.

$$x = R \times \cos(A) \quad \text{(b)}$$
$$y = R \times \sin(A)$$

$$Z = D_2 + D_3 R\cos(A) + D_4 R\sin(A) + D_5 R^2 \cos(2A) +$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) +$$
$$D_{11} R^3 \sin(3A) + D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) + D_{18}(5R^5 - 4R^3)\cos(3A) +$$
$$D_{19}(10R^5 - 12R^3 + 3R)\cos(A) + D_{20}(10R^5 - 12R^3 + 3R)\sin(A) +$$
$$D_{21}(5R^5 - 4R^3)\sin(3A) + D_{22} R^5 \sin(5A) + D_{23} R^6 \cos(6A) +$$
$$D_{24}(6R^6 - 5R^4)\cos(4A) + D_{25}(15R^6 - 20R^4 + 6R^2)\cos(2A) +$$
$$D_{26}(20R^6 - 30R^4 + 12R^2 - 1) + D_{27}(15R^6 - 20R^4 + 6R^2)\sin(2A) +$$
$$D_{28}(6R^6 - 5R^4)\sin(4A) + D_{29} R^6 \sin(6A)$$

where $D_m$ (m is an integer of 2 or higher) are coefficients.

Examples of other surfaces usable in the present invention include those which are given by the following defining equation:

$$Z = \Sigma\Sigma C_{nm} XY$$

Assuming that k=7 (polynomial of degree 7), for example, the equation, when expanded, may be given by:

$$Z = C_2 + C_3 y + C_4 |x| + C_5 y^2 + C_6 y|x| + C_7 x^2 + C_8 y^3 + C_9 y^2 |x| + \quad \text{(c)}$$
$$C_{10} yx^2 + C_{11} |x^3| + C_{12} y^4 + C_{13} y^3 |x| + C_{14} y^2 x^2 + C_{15} y|x^3| +$$
$$C_{16} x^4 C_{17} y^5 + C_{18} y^4 |x| + C_{19} y^3 x^2 + C_{20} y^2 |x^3| + C_{21} yx^4 +$$
$$C_{22} |x^5| + C_{23} y^6 + C_{24} y^5 |x| + C_{25} y^4 x^2 + C_{26} y^3 |x^3| +$$
$$C_{27} y^2 x^4 + C_{28} y|x^5| + C_{29} x^6 + C_{30} y^7 + C_{31} y^6 |x| + C_{32} y^5 x^2 +$$
$$C_{33} y^4 |x^3| + C_{34} y^3 x^4 + C_{35} y^2 |x^5| + C_{36} yx^6 + C_{37} |x^7|$$

The optical systems according to the following Examples 1, 5 to 7 are optimized on the assumption that each optical system is used in a ⅓-inch CCD camera having an image pickup area of 2.52×1.89 millimeters. In this case, the optical system according to each example can be applied to other CCD cameras or imaging optical systems for silver halide films by coefficient-multiplying the entire optical system.

The optical systems according Examples 2 to 4 are optimized on the assumption that each optical system is used in a taking lens for a 35-mm silver halide camera. In this case also, the optical system according to each example can be applied to CCD cameras or other imaging optical systems by coefficient-multiplying the entire optical system according to the size of each particular image pickup area.

In Examples 2 to 4, lens units G1 to G3 which are each formed from a rotationally symmetric optical system are designed by using ideal lenses having a refractive index of 100 and an Abbe's number of zero. Each of the lens units G1 to G3 may be formed by using any desired number of rotationally symmetric optical systems.

EXAMPLE 1

FIG. 1 is a sectional view of an optical system according to Example 1 taken by a YZ-plane containing the optical axis, showing the optical system at the wide-angle end. In this example, a first lens unit G1 includes a cemented lens comprising a negative meniscus lens having a convex surface directed toward the object side and a biconvex lens, and a positive meniscus lens having a convex surface directed toward the object side. A second lens unit G2 includes a negative meniscus lens having a convex surface directed toward the object side, and a cemented lens comprising a biconcave lens and a positive meniscus lens having a convex surface directed toward the object side. A third lens unit G3 comprises a single biconvex lens positioned to face the second lens unit G2 across a stop. A fourth lens unit G4 comprises a decentered optical system. The decentered optical system has a first surface that is a transmitting surface formed from a decentered three-dimensional surface common to the first and third surfaces; a second surface that is a reflecting surface formed from a decentered three-dimensional surface; a third surface that is a reflecting surface formed from the decentered three-dimensional surface common to the first and third surfaces; and a fourth surface that is a transmitting surface formed from a decentered three-dimensional surface. In this example, imaging field angles are as follows: The horizontal half field angle is from 27.2° to 14.4°, and the vertical half field angle is from 18.9° to 9.7°. The entrance pupil diameter is from 7.1 millimeters to 12.2 millimeters. The image height is 2.52× 1.89 millimeters. The focal length is equivalent to 35 millimeters to 70 millimeters in terms of the focal length of a 35-mm silver halide camera. The constituent parameters will be shown later. Displacements of each of the surface Nos. 15 and higher are expressed by amounts of displacement from the surface No. 14 (hypothetic plane). The surface Nos. 19 to 23 form a coaxial system, for which displacements are given as amounts of displacement of the top surface, i.e. the surface No. 19, from the surface No. 14.

EXAMPLE 2

Figure 2:
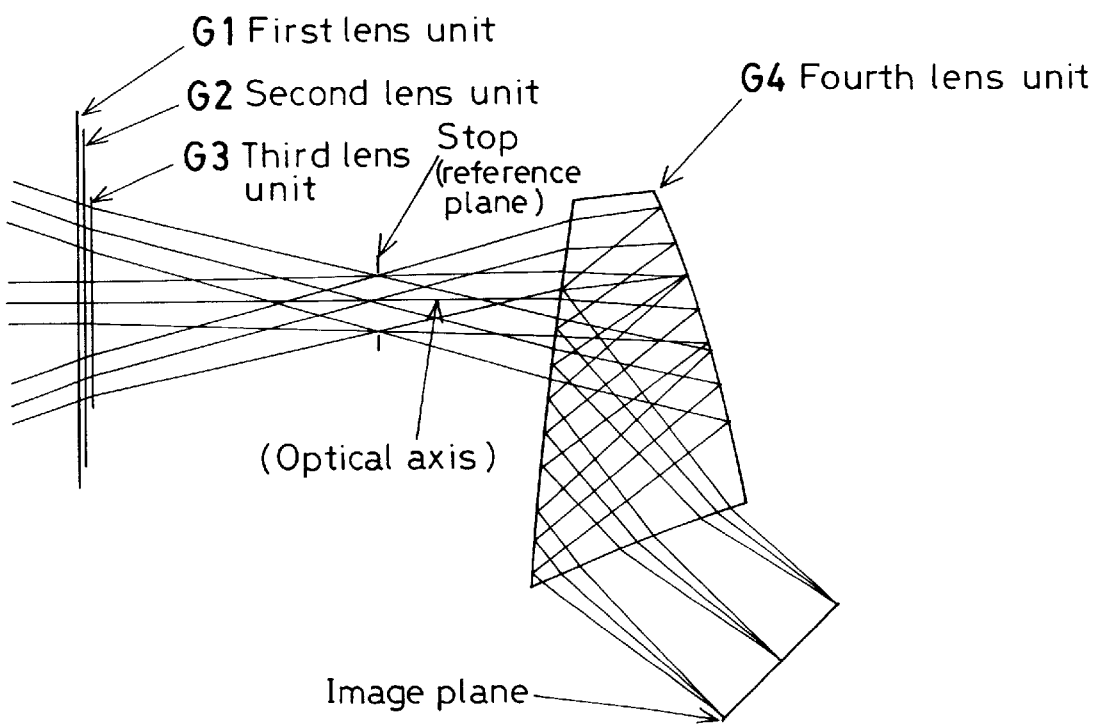
FIG. 2 is a sectional view showing a zoom lens system according to Example 2 at a wide-angle end thereof.

FIG. 2 is a sectional view of an optical system according to Example 2 taken by a YZ-plane containing the optical axis, showing the optical system at the wide-angle end. In this example, a fourth lens unit G4 is a decentered optical system. The decentered optical system has a first surface that is a transmitting surface formed from a decentered three-dimensional surface common to the first and third surfaces; a second surface that is a reflecting surface formed from a decentered three-dimensional surface; a third surface that is a reflecting surface formed from the decentered three-dimensional surface common to the first and third surfaces; and a fourth surface that is a transmitting surface formed from a decentered three-dimensional surface. In this example, imaging field angles are as follows: The horizontal half field angle is from 27.2° to 14.4°, and the vertical half field angle is from 18.9° to 9.7°. The entrance pupil diameter is from 7 millimeters to 14 millimeters. The image height is 18×12 millimeters. The focal length is equivalent to 35 millimeters to 70 millimeters in terms of the focal length of a rotationally symmetric optical system. The constituent parameters will be shown later. Displacements of each of the surface Nos. 8 and higher are expressed by amounts of displacement from the surface No. 7.

EXAMPLE 3

Figure 3:
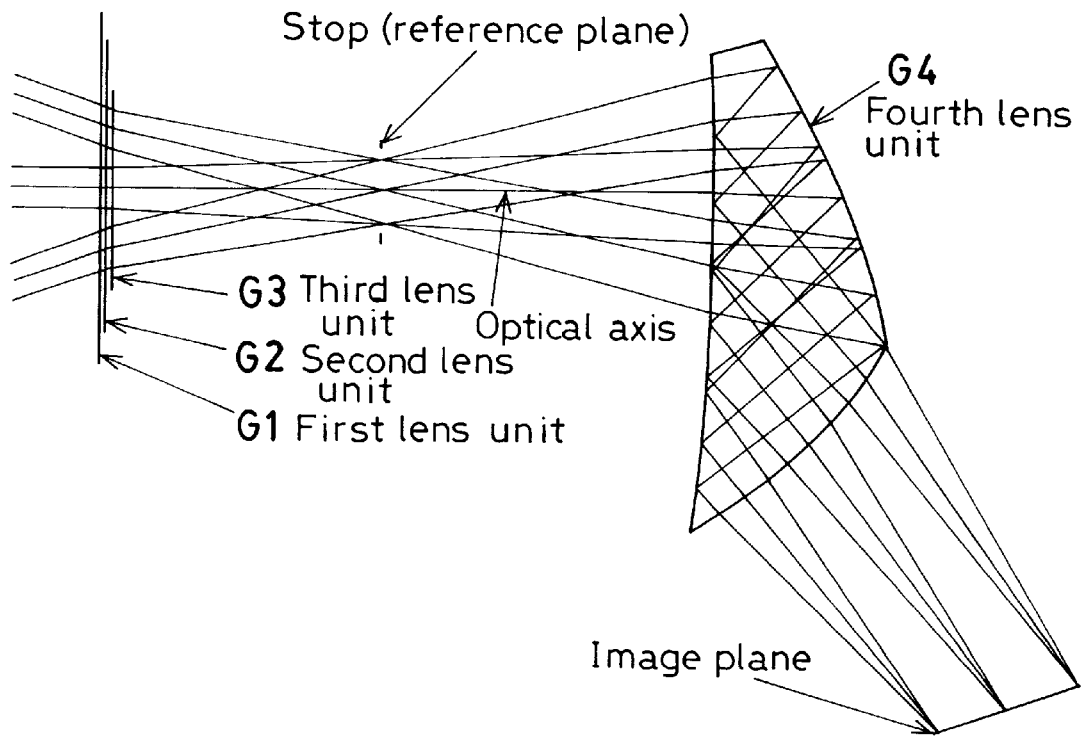
FIG. 3 is a sectional view showing a zoom lens system according to Example 3 at a wide-angle end thereof.

FIG. 3 is a sectional view of an optical system according to Example 3 taken by a YZ-plane containing the optical axis, showing the optical system at the wide-angle end. In this example, a fourth lens unit G4 is a decentered optical system. The decentered optical system has a first surface that is a transmitting surface formed from a decentered three-dimensional surface common to the first and third surfaces; a second surface that is a reflecting surface formed from a decentered three-dimensional surface; a third surface that is a reflecting surface formed from the decentered three-dimensional surface common to the first and third surfaces; and a fourth surface that is a transmitting surface formed from a decentered three-dimensional surface. In this example, imaging field angles are as follows: The horizontal half field angle is from 27.2° to 9.7°, and the vertical half field angle is from 18.9° to 6.5°. The entrance pupil diameter is from 7 millimeters to 14 millimeters. The image height is 18×12 millimeters. The focal length is equivalent to 35 millimeters to 105 millimeters in terms of the focal length of a rotationally symmetric optical system. The constituent parameters will be shown later. Displacements of each of the surface Nos. 8 and higher are expressed by amounts of displacement from the surface No. 7.

EXAMPLE 4

Figure 4:
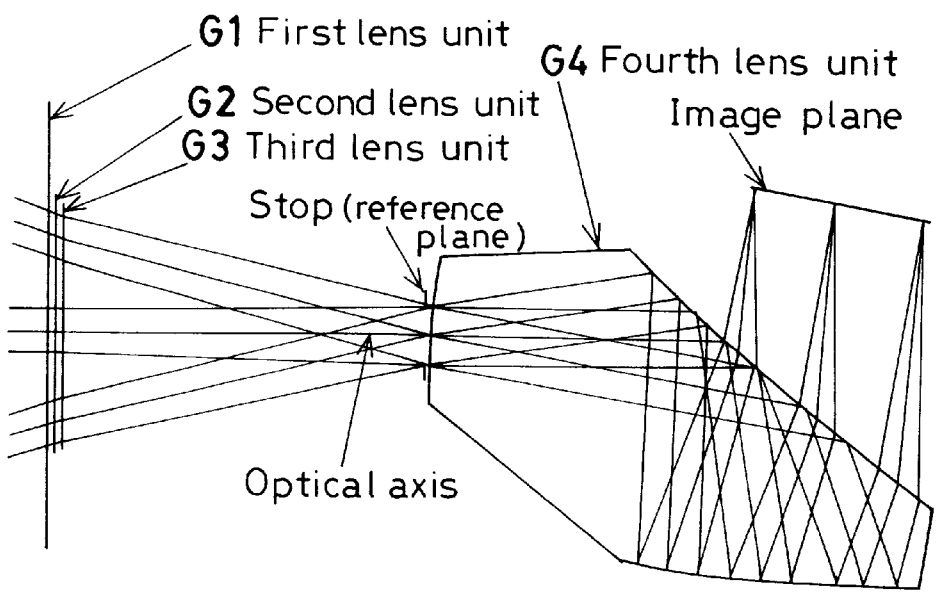
FIG. 4 is a sectional view showing a zoom lens system according to Example 4 at a wide-angle end thereof.

FIG. 4 is a sectional view of an optical system according to Example 4 taken by a YZ-plane containing the optical axis, showing the optical system at the wide-angle end. In this example, a fourth lens unit G4 is a decentered optical system. The decentered optical system has a first surface that is a transmitting surface formed from a decentered three-dimensional surface; a second surface that is a reflecting surface formed from a decentered three-dimensional surface common to the second and fourth surfaces; a third surface that is a reflecting surface formed from a decentered three-dimensional surface; and a fourth surface that is a transmitting surface formed from the decentered three-dimensional surface common to the second and fourth surfaces,. In this example, imaging field angles are as follows: The horizontal half field angle is from 27.2° to 14.4°, and the vertical half field angle is from 18.9° to 9.7°. The entrance pupil diameter is from 7.1 millimeters to 12.2 millimeters. The image height is 18×12 millimeters. The focal length is equivalent to 35 millimeters to 70 millimeters in terms of the focal length of a rotationally symmetric optical system. The constituent parameters will be shown later. Displacements of each of the surface Nos. 8 and higher are expressed by amounts of displacement from the surface No. 7.

EXAMPLE 5

Figure 5:
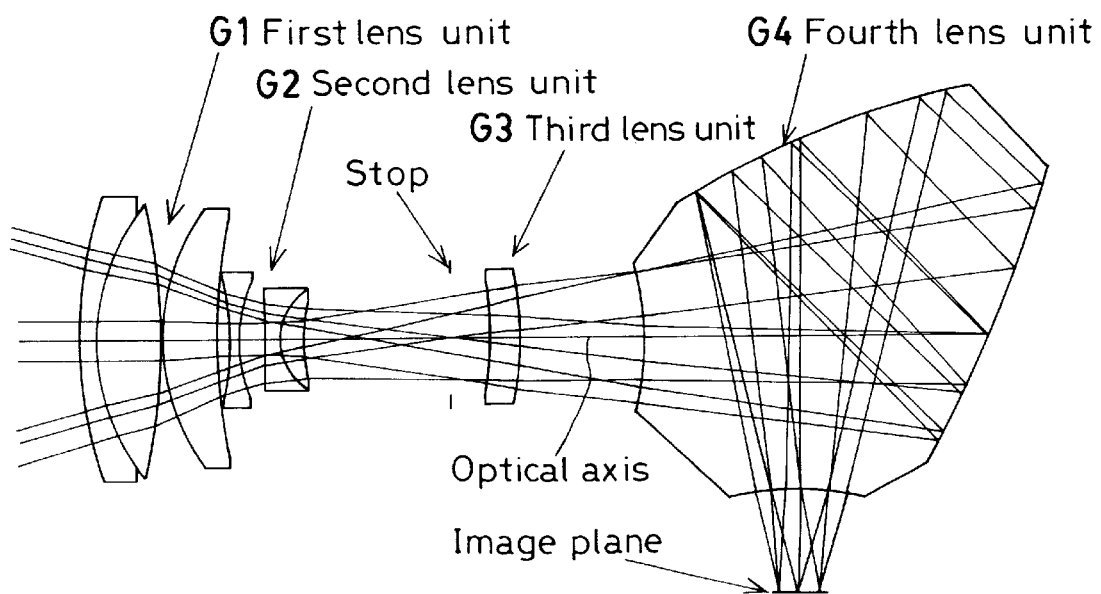
FIG. 5 is a sectional view showing a zoom lens system according to Example 5 at a wide-angle end thereof.

FIG. 5 is a sectional view of an optical system according to Example 5 taken by a YZ-plane containing the optical axis, showing the optical system at the wide-angle end. In this example, a first lens unit G1 includes a cemented lens comprising a negative meniscus lens having a convex surface directed toward the object side and a biconvex lens, and a positive meniscus lens having a convex surface directed toward the object side. A second lens unit G2 includes a biconcave lens, and a cemented lens comprising a biconcave lens and a positive meniscus lens having a convex surface directed toward the object side. A third lens unit G3 comprises a single positive meniscus lens having a convex surface directed toward the image side. The third lens unit G3 faces the second lens unit G2 across a stop. A fourth lens unit G4 comprises a decentered optical system. The decentered optical system has a first surface that is a transmitting surface formed from a decentered three-dimensional surface; a second surface that is a reflecting surface formed from a decentered three-dimensional surface; a third surface that is a reflecting surface formed from a decentered three-dimensional surface; and a fourth surface that is a transmitting surface formed from a three-dimensional surface. In this example, imaging field angles are as follows: The horizontal half field angle is from 21.2° to 2.8°, and the vertical half field angle is from 16.2° to 2.1°. The entrance pupil diameter is from 3.6 millimeters to 22.7 millimeters. The focal length is from 6.5 millimeters to 52 millimeters, which is equivalent to 46 millimeters to 371 millimeters in terms of the focal length of a 35-mm silver halide camera. The constituent parameters will be shown later. The positions of the vertices of the surface Nos. 14 to 18 are defined by surface separations along the principal ray. Displacement of each of the surface Nos. 14 to 18 is given by only the tilt angle of the center axis of an equation defining the surface with respect to the axial principal ray.

EXAMPLE 6

Figure 6:
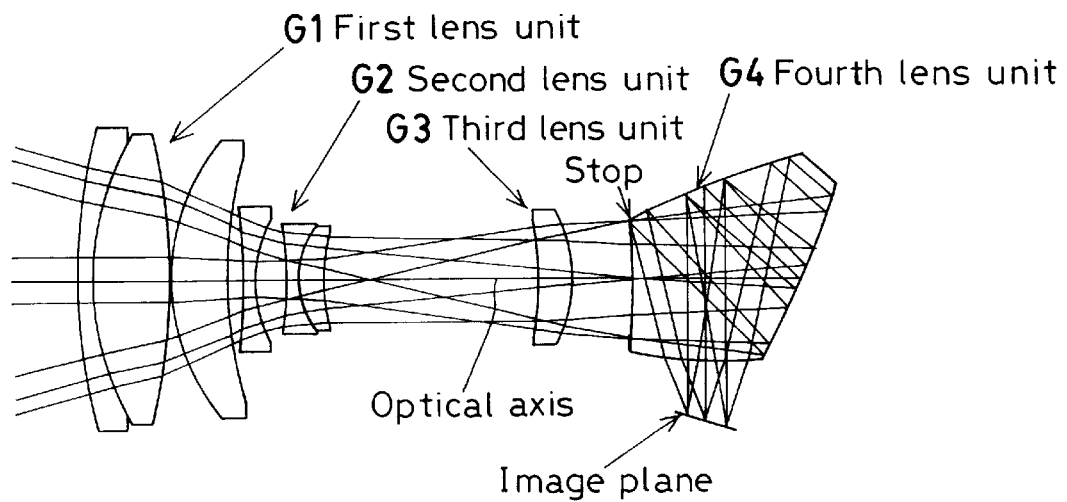
FIG. 6 is a sectional view showing a zoom lens system according to Example 6 at a wide-angle end thereof.

FIG. 6 is a sectional view of an optical system according to Example 6 taken by a YZ-plane containing the optical axis, showing the optical system at the wide-angle end. In this example, a first lens unit G1 includes a cemented lens comprising a negative meniscus lens having a convex surface directed toward the object side and a biconvex lens, and a positive meniscus lens having a convex surface directed toward the object side. A second lens unit G2 includes a biconcave lens, and a cemented lens comprising a biconcave lens and a positive meniscus lens having a convex surface directed toward the object side. A third lens unit G3 comprises a single positive meniscus lens having a convex surface directed toward the image side. A fourth lens unit G4 comprises a decentered optical system. The decentered optical system has a first surface that is a transmitting surface also serving as a stop and formed from a three-dimensional surface; a second surface that is a reflecting surface formed from a decentered three-dimensional surface; a third surface that is a reflecting surface formed from a decentered three-dimensional surface; and a fourth surface that is a transmitting surface formed from a three-dimensional surface. In this example, imaging field angles are as follows: The horizontal half field angle is from 21.2° to 2.8°, and the vertical half field angle is from 16.2° to 2.1°. The entrance pupil diameter is from 3.6 millimeters to 22.7 millimeters. The focal length is from 6.5 millimeters to 52 millimeters, which is equivalent to 46 millimeters to 371 millimeters in terms of the focal length of a 35-mm silver halide camera. The constituent parameters will be shown later. The positions of the vertices of the surface Nos. 13 to 17 are defined by surface separations along the principal ray. Displacement of each of the surface Nos. 13 to 17 is given by only the tilt angle of the center axis of an equation defining the surface with respect to the axial principal ray.

EXAMPLE 7

FIG. 7 is a sectional view of an optical system according to Example 7 taken by a YZ-plane containing the optical axis, showing the optical system at the wide-angle end. In this example, a first lens unit G1 includes a cemented lens comprising a negative meniscus lens having a convex surface directed toward the object side and a biconvex lens, and a positive meniscus lens having a convex surface directed toward the object side. A second lens unit G2 includes a biconcave lens, and a cemented lens comprising a biconcave lens and a positive meniscus lens having a convex surface directed toward the object side. A third lens unit G3 comprises a single biconvex lens positioned to face the second lens unit G2 across a stop. A fourth lens unit G4 comprises a decentered optical system. The decentered optical system has a first surface that is a transmitting surface formed from a decentered three-dimensional surface; a second surface that is a reflecting surface formed from a decentered three-dimensional surface common to the second and fourth surfaces; a third surface that is a reflecting surface formed from a decentered three-dimensional surface; and a fourth surface that is a transmitting surface formed from the decentered three-dimensional surface common to the second and fourth surfaces. In this example, imaging field angles are as follows: The horizontal half field angle is from 21.2° to 2.8°, and the vertical half field angle is from 16.2° to 2.1°. The entrance pupil diameter is from 3.6 millimeters to 22.7 millimeters. The focal length is from 6.5 millimeters to 52 millimeters, which is equivalent to 46 millimeters to 371 millimeters in terms of the focal length of a 35-mm silver halide camera. The constituent parameters will be shown later. Displacements of each of the surface Nos. 15 and higher are expressed by amounts of displacement from the surface No. 14 (hypothetic plane).

The constituent parameters of the above-described Examples 1 to 7 are as follows:

Example 1

| Surface No. | Radius of curvature | Surface separation | Refractive index (Displacement) | Abbe's No. (Tilt angle) |
|---|---|---|---|---|
| 1 | 45.155 | 1.500 | 1.8467 | 23.78 |
| 2 | 21.060 | 6.000 | 1.5687 | 63.16 |
| 3 | −101.082 | 0.150 | | |
| 4 | 23.199 | 5.000 | 1.6031 | 60.70 |
| 5 | 182.642 | $d_5$ | | |
| 6 | 26.546 | 1.100 | 1.6031 | 60.70 |
| 7 | 6.828 | 2.630 | | |
| 8 | −9.330 | 1.000 | 1.6031 | 60.70 |
| 9 | 6.947 | 2.160 | 1.8052 | 25.43 |
| 10 | 21.842 | $d_{10}$ | | |
| 11 | ∞ (Stop) | $d_{11}$ | | |
| 12 | 205.034 | 3.000 | 1.5638 | 60.70 |
| 13 | −57.143 | $d_{13}$ | | |
| 14 | ∞ (Hypothetic plane;Reference plane) | | | |
| 15 | Three-dimensional surface(1) (Transmissive surface) | Y 5.013 Z 2.876 | 1.5163 Θ 24.37° | 64.15 |
| 16 | Three-dimensional surface(2) (Reflective surface) | Y 1.077 Z 12.328 | 1.5163 Θ −7.04° | 64.15 |
| 17 | Three-dimensional surface(1) (Reflective surface) | Y 5.013 Z 2.876 | 1.5163 Θ 24.37° | 64.15 |
| 18 | Three-dimensional surface(3) (Transmissive surface) | Y 17.881 Z 7.218 | Θ 97.82° | |
| 19 | ∞ | 3.737 Y 17.978 Z 7.285 | 1.5477 Θ 55.30° | 62.84 |
| 20 | ∞ | 2.000 | | |
| 21 | ∞ | 1.000 | 1.4875 | 70.21 |
| 22 | ∞ | 0.700 | | |
| 23 | ∞ (Image plane) | | | |

Three-dimensional surface(1)

$C_5$  1.0473 × 10⁻³  $C_7$  −4.7301 × 10⁻⁵  $C_8$  1.7824 × 10⁻⁴
$C_{10}$  1.6149 × 10⁻⁴  $C_{12}$  3.8841 × 10⁻⁶  $C_{14}$  5.4551 × 10⁻⁶
$C_{16}$  1.9727 × 10⁻⁶

Three-dimensional surface(2)

$C_5$  −7.2581 × 10⁻³  $C_7$  −1.0291 × 10⁻²  $C_8$  1.5904 × 10⁻⁴
$C_{10}$  5.2271 × 10⁻⁵

-continued

Three-dimensional surface(3)

$C_5$  6.1245 × 10⁻³  $C_7$  3.7570 × 10⁻²  $C_8$  1.8959 × 10⁻³
$C_{10}$  −3.2308 × 10⁻³  $C_{12}$  −5.8327 × 10⁻⁵  $C_{14}$  2.9753 × 10⁻⁴
$C_{16}$  4.9686 × 10⁻⁵

| | W | S | T |
|---|---|---|---|
| Variable surface-separation | | | |
| $d_5$ | 1.00000 | 8.98420 | 14.10427 |
| $d_{10}$ | 14.10427 | 6.12008 | 1.00000 |
| $d_{11}$ | 7.96317 | 15.05490 | 5.03092 |
| $d_{13}$ | 7.19172 | 0.10000 | 10.12398 |
| Power and effective focal distance of total system | | | |
| P x | 0.124050 | 0.056920 | 0.019450 |
| P y | 0.165390 | 0.076480 | 0.026180 |
| F x | 8.061266 | 17.568517 | 51.413882 |
| F y | 6.046315 | 13.075314 | 38.197097 |
| Three-dimensional surface(2) (Reflective surface) | | | |
| DY | 0.000716 | | |
| Cxn | 0.970888 | | |
| Pxn/Px | 0.503170 | 1.096595 | 3.209162 |
| Pyn/Py | 0.266175 | 0.575611 | 1.681539 |
| Three-dimensional surface(1) (Reflective surface) | | | |
| DY | 0.001453 | | |
| Cxn | −1.085678 | | |
| Pxn/Px | 0.002313 | 0.005040 | 0.014750 |
| Pyn/Py | 0.038407 | 0.083057 | 0.242636 |
| Fg1 | 29.98091 | | |
| Fg2 | −6.53785 | | |
| Fg3 | 79.58538 | | |
| Fg1/Fg2 | −4.58574 | | |
| Fg1/Fg3 | 0.376714 | | |
| Fg1/Fxw | 3.719131 | | |
| Fg2/Fxw | −0.81102 | | |
| Fg3/Fxw | 9.872566 | | |
| Fg1/Fxt | 0.583129 | | |
| Fg2/Fxt | −0.12716 | | |
| Fg3/Fxt | 1.547936 | | |

Example 2

| Surface No. | Radius of curvature | Surface separation | Refractive index (Displacement) | Abbe's No. (Tilt angle) |
|---|---|---|---|---|
| 1 | 18092.320 | 0.000 | 100.0000 | 0.00 |
| 2 | ∞ | $d_2$ | | |
| 3 | −160191.809 | 0.000 | 100.0000 | 0.00 |
| 4 | ∞ | $d_4$ | | |
| 5 | −8687.641 | 0.000 | 100.0000 | 0.00 |
| 6 | ∞ | $d_6$ | | |
| 7 | ∞ (Stop;Reference plane) | | | |
| 8 | Three-dimensional surface(1) (Transmissive surface) | Y −21.891 Z 29.752 | 1.5163 Θ −5.63° | 64.15 |
| 9 | Three-dimensional surface(2) (Reflective surface) | Y −0.877 Z 55.478 | 1.5163 Θ 18.55° | 64.15 |
| 10 | Three-dimensional surface(1) (Reflective surface) | Y −21.891 Z 29.752 | 1.5163 Θ −5.63° | 64.15 |
| 11 | Three-dimensional surface(3) (Transmissive surface) | Y −40.666 Z 45.228 | Θ −68.34° | |
| 12 | ∞ (Image plane) | Y −61.138 Z 69.058 | Θ −44.15° | |

Three-dimensional surface(1)

$C_5$  2.5758 × 10⁻⁴  $C_7$  −2.3618 × 10⁻³  $C_8$  0
$C_{10}$  2.1250 × 10⁻⁵

Three-dimensional surface(2)

$C_5$  −2.5242 × 10⁻³  $C_7$  −4.0218 × 10⁻³  $C_8$  0

-continued

| | | | |
|---|---|---|---|
| $C_{10}$ | $-1.0881 \times 10^{-6}$ | | |

Three-dimensional surface(3)

| | | | | | | |
|---|---|---|---|---|---|---|
| $C_5$ | $9.2664 \times 10^{-4}$ | $C_7$ | $-7.1551 \times 10^{-3}$ | $C_8$ | 0 | |
| $C_{10}$ | $3.0860 \times 10^{-5}$ | | | | | |

| | W | S | T |
|---|---|---|---|
| Variable surface-separation | | | |
| $d_2$ | 1.00000 | 21.49207 | 1.00000 |
| $d_4$ | 1.00000 | 1.00000 | 48.00000 |
| $d_6$ | 48.00000 | 27.50793 | 1.00000 |
| Power and effective focal distance of total system | | | |
| P x | 0.023780 | 0.018630 | 0.014020 |
| P y | 0.023540 | 0.018450 | 0.013580 |
| F x | 42.052145 | 53.676865 | 71.326676 |
| F y | 42.480884 | 54.200542 | 72.046110 |
| Three-dimensional surface(2) (Reflective surface) | | | |
| DY | −0.000296 | | |
| Cxn | 1.006514 | | |
| Pxn/Px | 1.025799 | 1.309367 | 1.739908 |
| Pyn/Py | 0.650386 | 0.829815 | 1.103032 |
| Three-dimensional surface(1) (Reflective surface) | | | |
| DY | 0.005440 | | |
| Cxn | 0.742480 | | |
| Pxn/Px | 0.602400 | 0.768925 | 1.021760 |
| Pyn/Py | 0.066368 | 0.084678 | 0.112558 |
| Fg1 | 182.7507 | | |
| Fg2 | −1618.1 | | |
| Fg3 | −87.754 | | |
| Fg1/Fg2 | −0.11294 | | |
| Fg1/Fg3 | −2.08254 | | |
| Fg1/Fxw | 4.345812 | | |
| Fg2/Fxw | −38.4784 | | |
| Fg3/Fxw | −2.08679 | | |
| Fg1/Fxt | 2.562165 | | |
| Fg2/Fxt | −22.6857 | | |
| Fg3/Fxt | −1.23031 | | |

-continued

Three-dimensional surface(3)

| | | | | | |
|---|---|---|---|---|---|
| $C_5$ | $-5.3723 \times 10^{-3}$ | $C_7$ | $-9.2072 \times 10^{-3}$ | $C_8$ | 0 |
| $C_{10}$ | $1.0619 \times 10^{-4}$ | | | | |

| | W | S | T |
|---|---|---|---|
| Variable surface-separation | | | |
| $d_2$ | 1.00000 | 15.43327 | 48.00000 |
| $d_4$ | 1.00000 | 11.50953 | 1.00000 |
| $d_6$ | 48.00000 | 23.05720 | 1.00000 |
| Power and effective focal distance of total system | | | |
| P x | 0.027510 | 0.016500 | 0.011150 |
| P y | 0.028130 | 0.016950 | 0.011490 |
| F x | 36.350418 | 60.606061 | 89.686099 |
| F y | 35.549236 | 58.997050 | 87.032202 |
| Three-dimensional surface(2) (Reflective surface) | | | |
| DY | 0.000821 | | |
| Cxn | 0.987549 | | |
| Pxn/Px | 0.918198 | 1.530887 | 2.265438 |
| Pyn/Py | 0.593552 | 0.985051 | 1.453143 |
| Three-dimensional surface(1) (Reflective surface) | | | |
| DY | 0.006885 | | |
| Cxn | 0.824790 | | |
| Pxn/Px | 0.878314 | 1.464389 | 2.167033 |
| Pyn/Py | 0.182199 | 0.302375 | 0.446062 |
| Fg1 | 132.0059 | | |
| Fg2 | 320.2783 | | |
| Fg3 | −43.1863 | | |
| Fg1/Fg2 | 0.41216 | | |
| Fg1/Fg3 | −3.05666 | | |
| Fg1/Fxw | 3.631483 | | |
| Fg2/Fxw | 8.810855 | | |
| Fg3/Fxw | −1.18806 | | |
| Fg1/Fxt | 1.471866 | | |
| Fg2/Fxt | 3.571103 | | |
| Fg3/Fxt | −0.48153 | | |

Example 3

| Surface No. | Radius of curvature | Surface separation | Refractive index (Displacement) | Abbe's No. (Tilt angle) |
|---|---|---|---|---|
| 1 | 13068.588 | 0.000 | 100.0000 | 0.00 |
| 2 | ∞ | $d_2$ | | |
| 3 | 31707.550 | 0.000 | 100.0000 | 0.00 |
| 4 | ∞ | $d_4$ | | |
| 5 | −4275.448 | 0.000 | 100.0000 | 0.00 |
| 6 | ∞ | $d_6$ | | |
| 7 | ∞ (Stop;Reference plane) | | | |
| 8 | Three-dimensional surface(1) (Transmissive surface) | | 1.5163 Y −22.631 Z 60.306 | 64.15 Θ −2.36° |
| 9 | Three-dimensional surface(2) (Reflective surface) | | 1.5163 Y −0.022 Z 82.680 | 64.15 Θ 22.62° |
| 10 | Three-dimensional surface(1) (Reflective surface) | | 1.5163 Y −22.631 Z 60.306 | 64.15 Θ −2.36° |
| 11 | Three-dimensional surface(3) (Transmissive surface) | | Y −43.989 Z 78.213 | Θ −44.24° |
| 12 | ∞ (Image plane) | | Y −91.074 Z 113.653 | Θ −70.54° |

Three-dimensional surface(1)

| | | | | | |
|---|---|---|---|---|---|
| $C_5$ | $-8.4501 \times 10^{-4}$ | $C_7$ | $-3.9837 \times 10^{-3}$ | $C_8$ | 0 |
| $C_{10}$ | $2.1250 \times 10^{-5}$ | | | | |

Three-dimensional surface(2)

| | | | | | |
|---|---|---|---|---|---|
| $C_5$ | $-2.7528 \times 10^{-3}$ | $C_7$ | $-4.1646 \times 10^{-3}$ | $C_8$ | 0 |
| $C_{10}$ | $1.8624 \times 10^{-6}$ | | | | |

Example 4

| Surface No. | Radius of curvature | Surface separation | Refractive index (Displacement) | Abbe's No. (Tilt angle) |
|---|---|---|---|---|
| 1 | 24543.338 | 0.000 | 100.0000 | 0.00 |
| 2 | ∞ | $d_2$ | | |
| 3 | −9742.052 | 0.000 | 100.0000 | 0.00 |
| 4 | ∞ | $d_4$ | | |
| 5 | 127063.565 | 0.000 | 100.0000 | 0.00 |
| 6 | ∞ | $d_6$ | | |
| 7 | ∞ (Stop;Reference plane) | | | |
| 8 | Three-dimensional surface(1) (Transmissive surface) | | 1.5163 Y 0.000 Z 1.000 | 64.15 Θ −0.70° |
| 9 | Three-dimensional surface(2) (Reflective surface) | | 1.5163 Y −0.200 Z 49.107 | 64.15 Θ 49.30° |
| 10 | Three-dimensional surface(3) (Reflective surface) | | 1.5163 Y −38.755 Z 55.104 | 64.15 Θ 86.02° |
| 11 | Three-dimensional surface(2) (Transmissive surface) | | Y −0.200 Z 49.107 | Θ 49.30° |
| 12 | ∞(Image plane) | | Y 21.511 Z 65.224 | Θ 80.42° |

Three-dimensional surface(1)

| | | | | | |
|---|---|---|---|---|---|
| $C_5$ | $5.6151 \times 10^{-3}$ | $C_7$ | | $5.0016 \times 10^{-3}$ | |
| $C_8$ | $8.0886 \times 10^{-5}$ | $C_{10}$ | | $3.0831 \times 10^{-5}$ | |

Three-dimensional surface(2)

| | | | | | |
|---|---|---|---|---|---|
| $C_5$ | $5.3817 \times 10^{-4}$ | $C_7$ | $-2.8175 \times 10^{-5}$ | $C_8$ | $2.9917 \times 10^{-6}$ |
| $C_{10}$ | $-1.2314 \times 10^{-6}$ | | | | |

-continued

Three-dimensional surface(3)

| | | | | | |
|---|---|---|---|---|---|
| $C_5$ | $3.0907 \times 10^{-3}$ | $C_7$ | $3.0261 \times 10^{-3}$ | $C_8$ | $4.7100 \times 10^{-6}$ |
| $C_{10}$ | $1.7865 \times 10^{-6}$ | | | | |

| | W | S | T |
|---|---|---|---|
| Variable surface-separation | | | |
| $d_2$ | 1.00000 | 29.19266 | 58.00000 |
| $d_4$ | 1.00000 | 18.97795 | 1.00000 |
| $d_6$ | 58.00000 | 11.82940 | 1.00000 |
| Power and effective focal distance of total system | | | |
| P x | 0.023710 | 0.018560 | 0.013990 |
| P y | 0.024620 | 0.019280 | 0.014540 |
| F x | 42.176297 | 53.879310 | 71.479628 |
| F y | 40.617384 | 51.867220 | 68.775791 |
| Three-dimensional surface(2) (Reflective surface) | | | |
| DY | −0.000149 | | |
| Cxn | 3.226693 | | |
| Pxn/Px | 0.007208 | 0.009207 | 0.012215 |
| Pyn/Py | 0.132582 | 0.169304 | 0.224496 |
| Three-dimensional surface(3) (Reflective surface) | | | |
| DY | 0.000645 | | |
| Cxn | 1.016159 | | |
| Pxn/Px | 0.774115 | 0.988915 | 1.311956 |
| Pyn/Py | 0.761417 | 0.972307 | 1.289277 |

| | |
|---|---|
| Fg1 | 247.9125 |
| Fg2 | −98.4046 |
| Fg3 | 1283.47 |
| Fg1/Fg2 | −2.51932 |
| Fg1/Fg3 | 0.193158 |
| Fg1/Fxw | 5.878005 |
| Fg2/Fxw | −2.33317 |
| Fg3/Fxw | 30.43108 |
| Fg1/Fxt | 3.468296 |
| Fg2/Fxt | −1.37668 |
| Fg3/Fxt | 17.95575 |

Example 5

| Surface No. | Radius of curvature | Surface separation | Refractive index (Displacement) | Abbe's No. (Tilt angle) |
|---|---|---|---|---|
| 1 | 40.073 | 1.500 | 1.8467 | 23.78 |
| 2 | 20.827 | 6.000 | 1.5687 | 63.16 |
| 3 | −55.729 | 0.150 | | |
| 4 | 22.484 | 5.000 | 1.6031 | 60.70 |
| 5 | 50.455 | $d_5$ | | |
| 6 | −29.503 | 1.100 | 1.6031 | 60.70 |
| 7 | 11.274 | 2.630 | | |
| 8 | −24.876 | 1.000 | 1.6031 | 60.70 |
| 9 | 5.056 | 2.160 | 1.8052 | 25.43 |
| 10 | 9.240 | $d_{10}$ | | |
| 11 | ∞ (Stop) | $d_{11}$ | | |
| 12 | −42.331 | 3.000 | 1.5638 | 60.70 |
| 13 | −24.437 | $d_{13}$ | | |
| 14 | Three-dimensional surface(1) (Transmissive surface) | 32.000 | 1.5163 | 64.15 |
| 15 | Three-dimensional surface(2) (Reflective surface) | −25.000 | 1.5163 | 64.15 Θ −22.50° |
| 16 | Three-dimensional surface(3) (Reflective surface) | 32.000 | 1.5163 | 64.15 Θ −22.50° |
| 17 | Three-dimensional surface(4) (Transmissive surface) | 10.000 | | |
| 18 | ∞ (Image plane) | | | Θ −0.66° |

Three-dimensional surface(1)

| | | | | | |
|---|---|---|---|---|---|
| $C_5$ | $-1.9224 \times 10^{-2}$ | $C_7$ | $-1.4540 \times 10^{-2}$ | $C_8$ | $-2.2302 \times 10^{-4}$ |
| $C_{10}$ | $1.1054 \times 10^{-4}$ | | | | |

-continued

Three-dimensional surface(2)

| | | | | | |
|---|---|---|---|---|---|
| $C_5$ | $-3.6920 \times 10^{-3}$ | $C_7$ | $-4.8224 \times 10^{-3}$ | $C_8$ | $-4.8320 \times 10^{-6}$ |
| $C_{10}$ | $2.0576 \times 10^{-5}$ | | | | |

Three-dimensional surface(3)

| | | | | | |
|---|---|---|---|---|---|
| $C_5$ | $4.6626 \times 10^{-3}$ | $C_7$ | $4.1781 \times 10^{-3}$ | $C_8$ | $-3.0097 \times 10^{-5}$ |
| $C_{10}$ | $-5.1888 \times 10^{-6}$ | | | | |

Three-dimensional surface(4)

| | | | | | |
|---|---|---|---|---|---|
| $C_5$ | $2.3157 \times 10^{-2}$ | $C_7$ | $3.0958 \times 10^{-3}$ | $C_8$ | $2.5238 \times 10^{-4}$ |
| $C_{10}$ | $-4.1327 \times 10^{-5}$ | | | | |

| | W | S | T |
|---|---|---|---|
| Variable surface-separation | | | |
| $d_5$ | 1.00933 | 9.08440 | 14.06432 |
| $d_{10}$ | 14.09495 | 6.01987 | 1.03995 |
| $d_{11}$ | 3.75080 | 13.30848 | 1.00000 |
| $d_{13}$ | 11.55768 | 2.00000 | 14.30848 |
| Power and effective focal distance of total system | | | |
| P x | 0.152090 | 0.065710 | 0.020370 |
| P y | 0.152930 | 0.066330 | 0.023120 |
| F x | 6.575054 | 15.218384 | 49.091802 |
| F y | 6.538939 | 15.076134 | 43.252595 |
| Three-dimensional surface(2) (Reflective surface) | | | |
| DY | 0.001008 | | |
| Cxn | 0.951870 | | |
| Pxn/Px | 0.192316 | 0.445129 | 1.435906 |
| Pyn/Py | 0.146428 | 0.337602 | 0.968562 |
| Three-dimensional surface(3) (Reflective surface) | | | |
| DY | −0.000254 | | |
| Cxn | 0.985565 | | |
| Pxn/Px | 0.166622 | 0.385657 | 1.244061 |
| Pyn/Py | 0.184922 | 0.426356 | 1.223190 |

| | |
|---|---|
| Fg1 | 29.88549 |
| Fg2 | −5.89163 |
| Fg3 | 96.6864 |
| Fg1/Fg2 | −5.07253 |
| Fg1/Fg3 | 0.309097 |
| Fg1/Fxw | 4.545284 |
| Fg2/Fxw | −0.89606 |
| Fg3/Fxw | 14.70503 |
| Fg1/Fxt | 0.608767 |
| Fg2/Fxt | −0.12001 |
| Fg3/Fxt | 1.969502 |

Example 6

| Surface No. | Radius of curvature | Surface separation | Refractive index Displacement | Abbe's No. (Tilt angle) |
|---|---|---|---|---|
| 1 | 52.745 | 1.500 | 1.8467 | 23.78 |
| 2 | 27.171 | 6.000 | 1.5687 | 63.16 |
| 3 | −63.969 | 0.150 | | |
| 4 | 18.289 | 5.000 | 1.6031 | 60.70 |
| 5 | 41.065 | $d_5$ | | |
| 6 | −47.500 | 1.100 | 1.6031 | 60.70 |
| 7 | 9.408 | 2.630 | | |
| 8 | −28.044 | 1.000 | 1.6031 | 60.70 |
| 9 | 6.637 | 2.160 | 1.8052 | 25.43 |
| 10 | 12.544 | $d_{10}$ | | |
| 11 | −23.365 | 3.000 | 1.5638 | 60.70 |
| 12 | −13.718 | $d_{12}$ | | |
| 13 | Three-dimensional surface(1) (Transmissive surface) (Stop) | 14.000 | 1.5163 | 64.15 |
| 14 | Three-dimensional surface(2) (Reflective surface) | −11.000 | 1.5163 | 64.15 Θ −22.50° |
| 15 | Three-dimensional surface(3) (Reflective surface) | 15.000 | 1.5163 | 64.15 Θ −22.50° |

-continued

| 16 | Three-dimensional surface(4) (Transmissive surface) | 5.255 | | |
|---|---|---|---|---|
| 17 | ∞ (Image plane) | | Θ | −17.22° |

Three-dimensional surface(1)

$C_5$ $-7.8476 \times 10^{-3}$  $C_7$ $4.8893 \times 10^{-3}$  $C_8$ $1.9751 \times 10^{-4}$
$C_{10}$ $1.0419 \times 10^{-3}$ Three-dimensional surface(2)

$C_5$ $-4.9754 \times 10^{-3}$  $C_7$ $-6.6959 \times 10^{-3}$  $C_8$ $-4.4642 \times 10^{-5}$
$C_{10}$ $8.8656 \times 10^{-5}$ Three-dimensional surface(3)

$C_5$ $6.7139 \times 10^{-3}$  $C_7$ $4.1830 \times 10^{-3}$  $C_8$ $-1.5508 \times 10^{-4}$
$C_{10}$ $-1.1745 \times 10^{-4}$ Three-dimensional surface(4)

$C_5$ $-9.7952 \times 10^{-3}$  $C_7$ $1.8850 \times 10^{-2}$  $C_8$ $5.3570 \times 10^{-4}$
$C_{10}$ $-4.0620 \times 10^{-3}$

| | W | S | T |
|---|---|---|---|
| Variable surface-separation | | | |
| $d_5$ | 1.27840 | 8.66092 | 13.02166 |
| $d_{10}$ | 18.82863 | 15.75184 | 1.00000 |
| $d_{12}$ | 5.30572 | 1.00000 | 11.39110 |
| Power and effective focal distance of total system | | | |
| P x | 0.130860 | 0.059090 | 0.020740 |
| P y | 0.182100 | 0.085440 | 0.030420 |
| F x | 7.641755 | 16.923337 | 48.216008 |
| F y | 5.491488 | 11.704120 | 32.873110 |
| Three-dimensional surface(2) (Reflective surface) | | | |
| DY | 0.000107 | | |
| Cxn | 0.977717 | | |
| Pxn/Px | 0.310353 | 0.687304 | 1.958186 |
| Pyn/Py | 0.165719 | 0.353200 | 0.992025 |
| Three-dimensional surface(3) (Reflective surface) | | | |
| DY | −0.000301 | | |
| Cxn | 0.927108 | | |
| Pxn/Px | 0.193881 | 0.429366 | 1.223300 |
| Pyn/Py | 0.223624 | 0.476615 | 1.338657 |
| Fg1 | 29.20425 | | |
| Fg2 | −6.60228 | | |
| Fg3 | 52.99068 | | |
| Fg1/Fg2 | −4.42336 | | |
| Fg1/Fg3 | 0.551121 | | |
| Fg1/Fxw | 3.821668 | | |
| Fg2/Fxw | −0.86397 | | |
| Fg3/Fxw | 6.93436 | | |
| Fg1/Fxt | 0.605696 | | |
| Fg2/Fxt | −0.13693 | | |
| Fg3/Fxt | 1.099027 | | |

Example 7

| Surface No. | Radius of curvature | Surface separation | Refractive index (Displacement) | Abbe's No. (Tilt angle) |
|---|---|---|---|---|
| 1 | 63.679 | 1.500 | 1.8467 | 23.78 |
| 2 | 29.117 | 6.000 | 1.5687 | 63.16 |
| 3 | −54.462 | 0.150 | | |
| 4 | 15.586 | 5.000 | 1.6031 | 60.70 |
| 5 | 25.619 | $d_5$ | | |
| 6 | −45.507 | 1.100 | 1.6031 | 60.70 |
| 7 | 13.417 | 2.630 | | |
| 8 | −11.406 | 1.000 | 1.6031 | 60.70 |
| 9 | 7.538 | 2.160 | 1.8052 | 25.43 |
| 10 | 16.174 | $d_{10}$ | | |
| 11 | ∞ | $d_{11}$ | | |
| 12 | 31.500 | 3.000 | 1.5638 | 60.70 |
| 13 | −19.687 | $d_{13}$ | | |
| 14 | ∞ (Hypothetic plane;Reference plane) | | | |
| 15 | Three-dimensional surface(1) (Transmissive surface) | | 1.5163 Y 0.000 Z −0.088 | 64.15 Θ 8.11° |
| 16 | Three-dimensional surface(2) (Reflective surface) | | 1.5163 Y 0.447 Z 9.134 | 64.15 Θ 58.11° |
| 17 | Three-dimensional surface(3) (Reflective surface) | | 1.5163 Y −6.813 Z 12.284 | 64.15 Θ 84.02° |
| 18 | Three-dimensional surface(2) (Transmissive surface) | | Y 0.447 Z 9.134 | Θ 58.11° |
| 19 | ∞ (Image plane) | | Y −0.598 Z 16.873 | Θ 52.06° |

Three-dimensional surface(1)

$C_5$ $4.2276 \times 10^{-2}$  $C_7$ $4.5829 \times 10^{-2}$  $C_8$ $2.7185 \times 10^{-4}$
$C_{10}$ $9.0513 \times 10^{-5}$ Three-dimensional surface(2)

$C_5$ $1.7567 \times 10^{-3}$  $C_7$ $-6.1247 \times 10^{-4}$  $C_8$ $6.5561 \times 10^{-6}$
$C_{10}$ $1.1332 \times 10^{-4}$ Three-dimensional surface(3)

$C_5$ $9.9191 \times 10^{-3}$  $C_7$ $-2.1835 \times 10^{-3}$  $C_8$ $-1.2220 \times 10^{-4}$
$C_{10}$ $4.3088 \times 10^{-4}$

| | W | S | T |
|---|---|---|---|
| Variable surface-separation | | | |
| $d_5$ | 1.08861 | 8.99025 | 13.15755 |
| $d_{10}$ | 13.60679 | 5.70515 | 1.53785 |
| $d_{11}$ | 1.00000 | 6.63507 | 1.00000 |
| $d_{13}$ | 8.39621 | 2.76113 | 8.39621 |
| Power and effective focal distance of total system | | | |
| P x | 0.103760 | 0.053710 | 0.019700 |
| P y | 0.138900 | 0.070700 | 0.026180 |
| F x | 9.637625 | 18.618507 | 50.761421 |
| F y | 7.199424 | 14.144272 | 38.197097 |
| Three-dimensional surface(2) (Reflective surface) | | | |
| DY | 0.000327 | | |
| Cxn | 0.410619 | | |
| Pxn/Px | 0.035802 | 0.069165 | 0.188570 |
| Pyn/Py | 0.076709 | 0.150706 | 0.406988 |
| Three-dimensional surface(3) (Reflective surface) | | | |
| DY | 0.001724 | | |
| Cxn | 0.434082 | | |
| Pxn/Px | 0.127637 | 0.246577 | 0.672265 |
| Pyn/Py | 0.433135 | 0.850955 | 2.298033 |
| Fg1 | 30.71597 | | |
| Fg2 | −6.50396 | | |
| Fg3 | 21.95061 | | |
| Fg1/Fg2 | −4.72266 | | |
| Fg1/Fg3 | 1.399322 | | |
| Fg1/Fxw | 3.187089 | | |
| Fg2/Fxw | −0.67485 | | |
| Fg3/Fxw | 2.277596 | | |
| Fg1/Fxt | 0.605105 | | |
| Fg2/Fxt | −0.12813 | | |
| Fg3/Fxt | 0.432427 | | |

The present invention is not necessarily limited to the above-described examples. It is also possible to use a pair of decentered optical systems formed from rotationally asymmetric surfaces. In this case also, it is important for at least one rotationally asymmetric surface to satisfy at least one of the conditions (1-1) to (11-3).

The decentered optical system according to the present invention may be arranged as shown in FIGS. 19 to 22.

Figure 19:
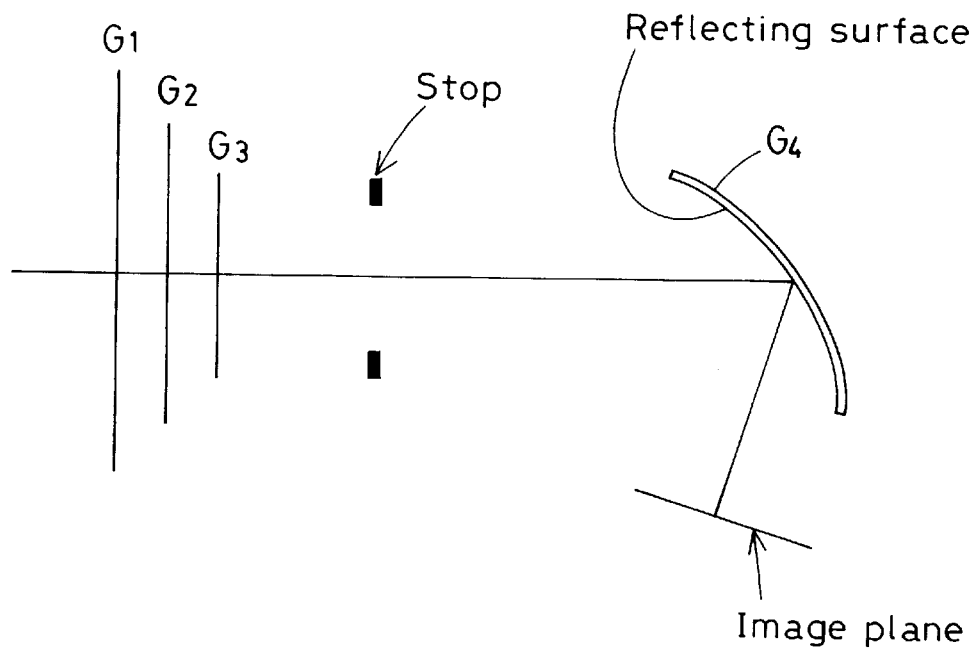
FIG. 19 is a sectional view showing a modification of a decentered optical system used in the present invention.

FIG. 19 shows an example in which a fourth lens unit G4 comprises only a mirror-coated reflecting surface arranged in the form of a three-dimensional surface.

Figure 20:
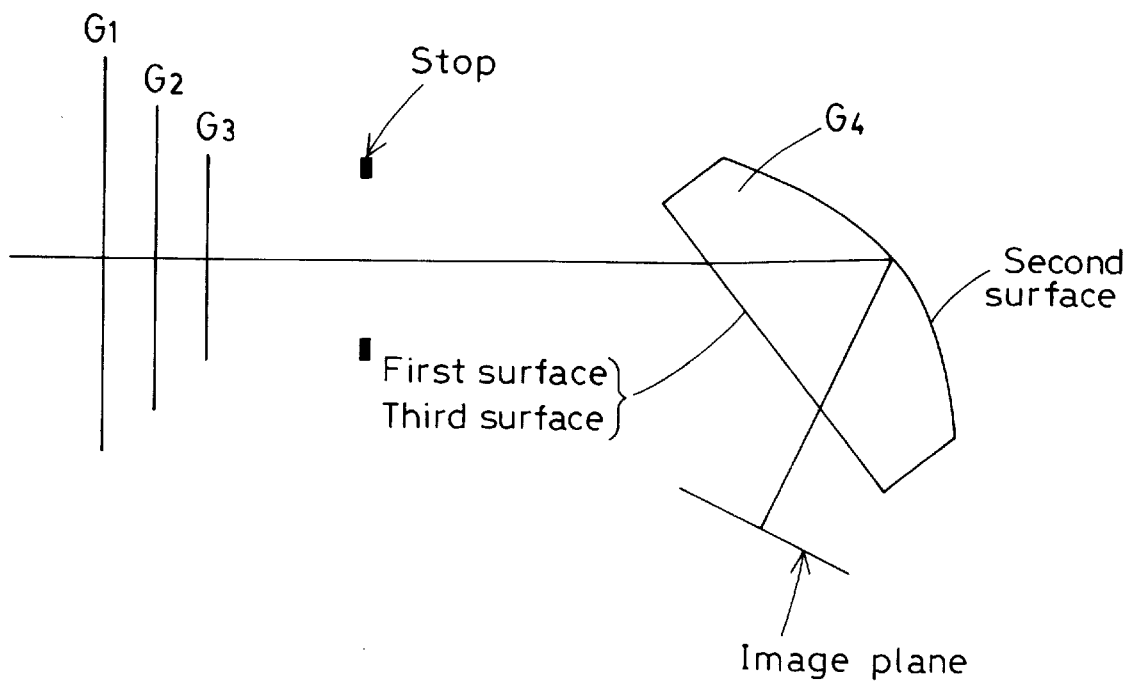
FIG. 20 is a sectional view showing another modification of the decentered optical system.

FIG. 20 shows an example in which a fourth lens unit G4 comprises a first surface that is a decentered transmitting surface common to the first and third surfaces; a second surface that is a reflecting surface formed from a decentered three-dimensional surface; and a third surface formed from the decentered transmitting surface common to the first and third surfaces. It is desirable from the viewpoint of correcting aberrations even more favorably that the transmitting surface serving as both the first and third surfaces should also be arranged in the form of a three-dimensional surface.

Figure 21:
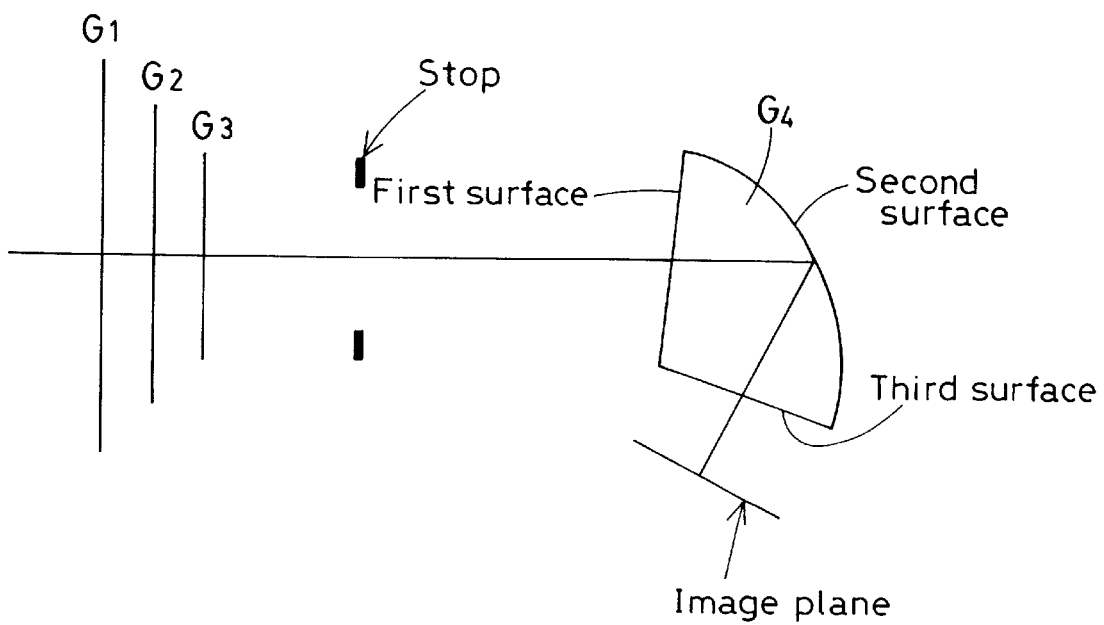
FIG. 21 is a sectional view showing still another modification of the decentered optical system.

FIG. 21 shows an example in which a fourth lens unit G4 comprises a first surface that is a transmitting surface; a second surface that is a reflecting surface formed from a decentered three-dimensional surface; and a third surface that is a transmitting surface. It is desirable from the viewpoint of aberration correction that the first surface and/or the third surface should be arranged in the form of a three-dimensional surface.

Figure 22:
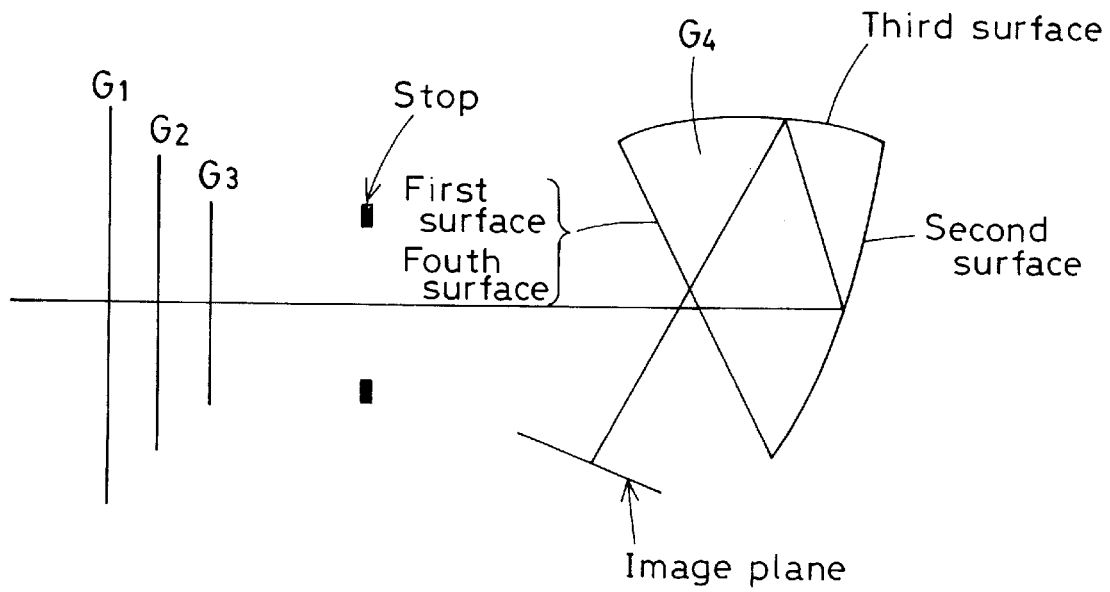
FIG. 22 is a sectional view showing a further modification of the decentered optical system.

FIG. 22 shows an example in which a fourth lens unit G4 comprises a first surface that is a transmitting surface common to the first and fourth surfaces; a second surface that is a decentered reflecting surface; a third surface that is a decentered reflecting surface; and a fourth surface that is a transmitting surface common to the first and fourth surfaces. The second surface and/or the third surface is formed from a three-dimensional surface. It is desirable from the viewpoint of aberration correction that the transmitting surface serving as both the first and fourth surfaces should be arranged in the form of a three-dimensional surface.

Incidentally, in a case where a rotationally asymmetric surface according to the present invention is used as a reflecting surface, particularly as a back-coated mirror, it is possible to use various forms of reflecting surfaces in addition to a totally reflecting surface that utilizes an angle of incidence greater than the critical angle. As shown in FIGS. 8(a), 8(b) and 8(c), examples of reflecting surfaces usable in the present invention include a structure in which, as shown in FIG. 8(a), a transparent member 11 made of a transparent material such as a glass or plastic material has an aluminum coating layer 12 provided on the surface thereof; a structure in which, as shown in FIG. 8(b), a transparent member 11 has a silver coating layer 13 provided on the surface thereof; and a structure in which, as shown in FIG. 8(c), a transparent member 11 has an aluminum coating layer 12 partially provided on the surface thereof to form a semitransparent mirror. It is also possible to use a reflecting surface structure which is provided with an optical multilayer film so as to have a reflectivity of 100% or to form a semitransparent mirror.

Figure 9:
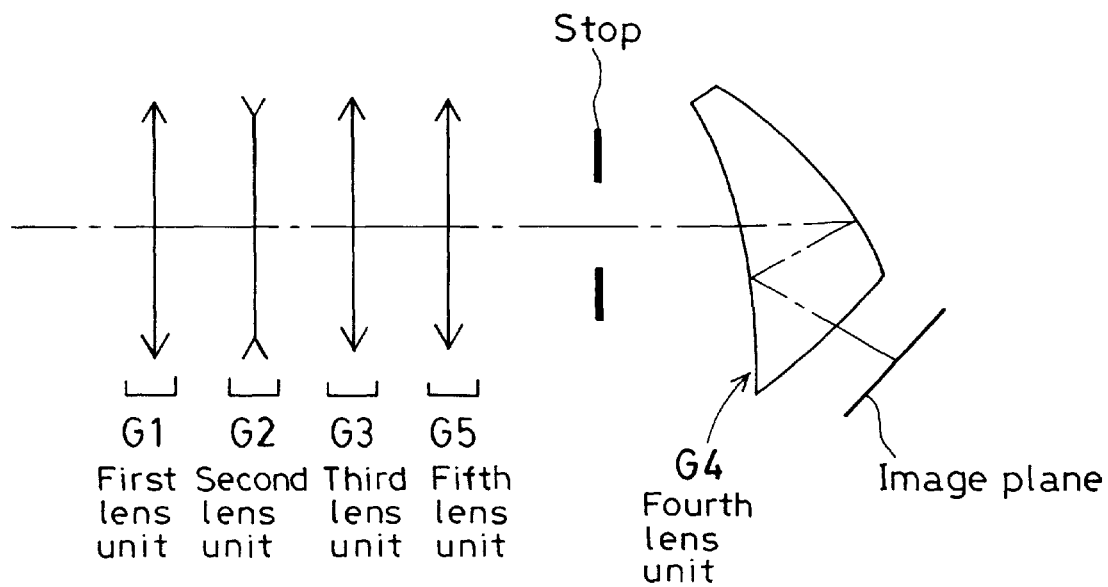
FIG. 9 shows one form of the variable-magnification image-forming optical system according to the present invention in a case where the optical system is formed from five lens units.
Figure 10:
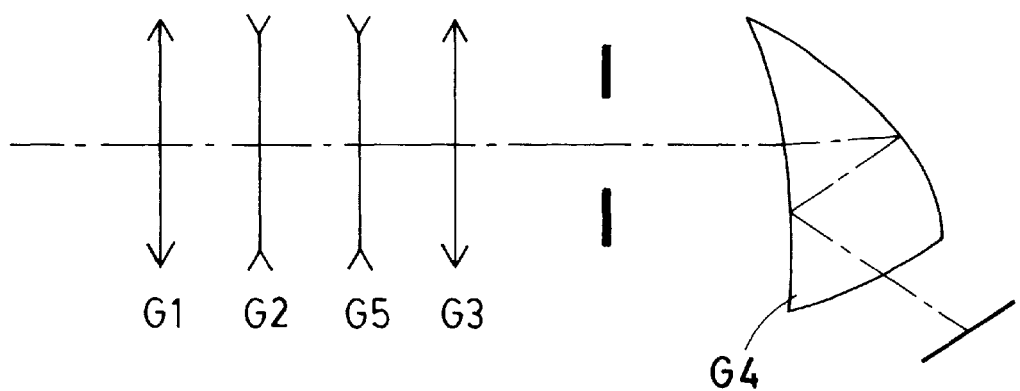
FIG. 10 shows another form of the variable-magnification image-forming optical system according to the present invention in a case where the optical system is formed from five lens units.
Figure 11:
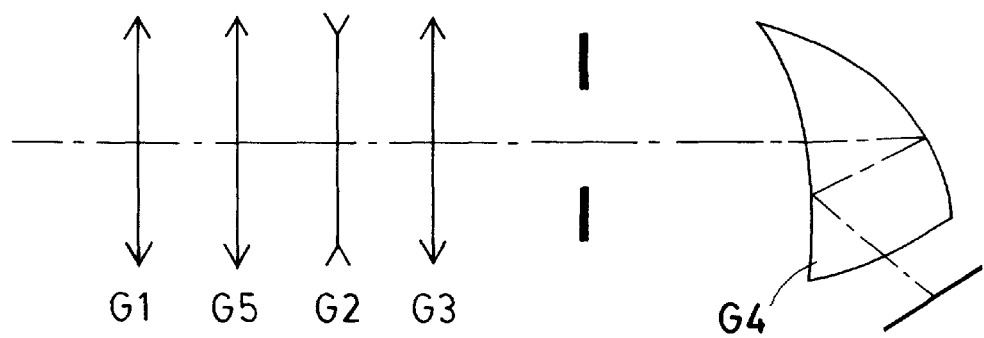
FIG. 11 shows still another form of the variable-magnification image-forming optical system according to the present invention in a case where the optical system is formed from five lens units.

In the variable-magnification image-forming optical system according to the present invention, the number of zoom lens units located on the object side of the fourth lens unit G4 is not necessarily limited to 3 (i.e. the first lens unit G1 to the third lens unit G3). By increasing the number of zoom lens units, e.g. 4, 5, . . . , a higher zoom ratio can be obtained. Specific examples are shown in FIGS. 9 to 11. FIG. 9 shows an example in which a fifth lens unit G5 is provided between the third lens unit G3 and the fourth lens unit G4. FIG. 10 shows an example in which a fifth lens unit G5 is provided between the second lens unit G2 and the third lens unit G3. FIG. 11 shows an example in which a fifth lens unit G5 is provided between the first lens unit G1 and the second lens unit G2.

Figure 12:
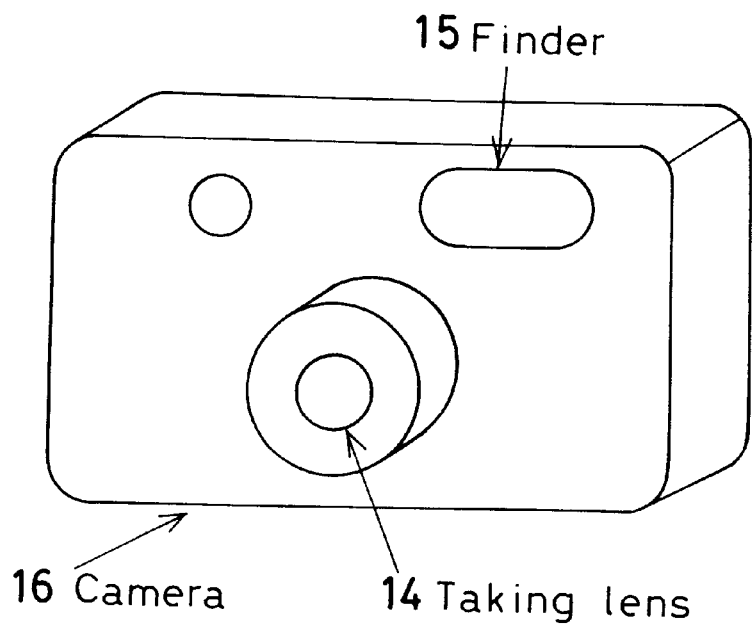
FIG. 12 is a perspective view schematically showing the arrangement of a camera to which an image-forming optical system according to the present invention is applied.
Figure 13:
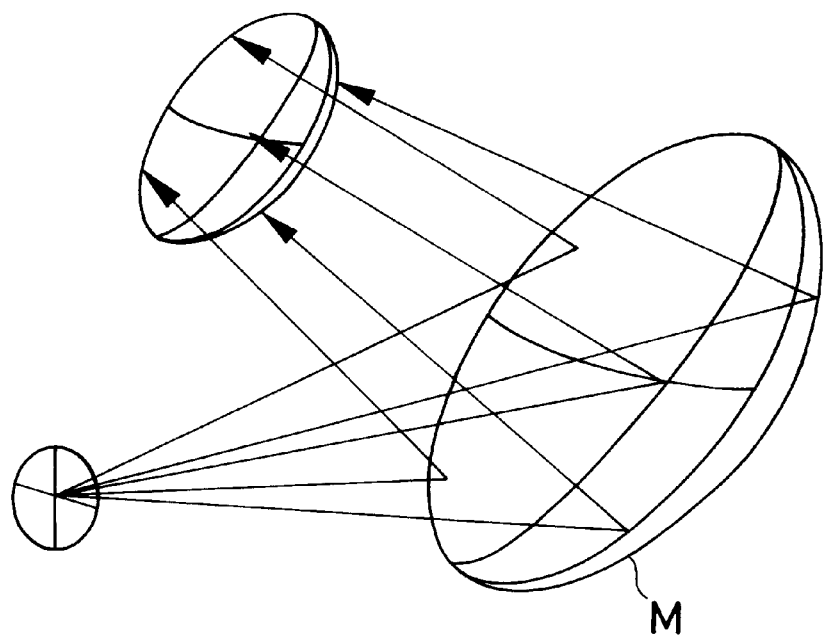
FIG. 13 shows curvature of field produced by a decentered concave mirror.
Figure 14:
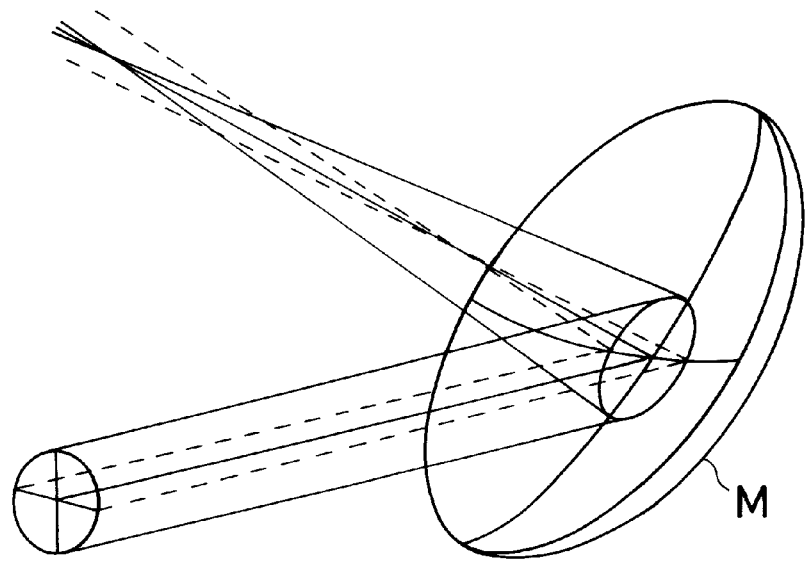
FIG. 14 shows axial astigmatism produced by a decentered concave mirror.
Figure 15:
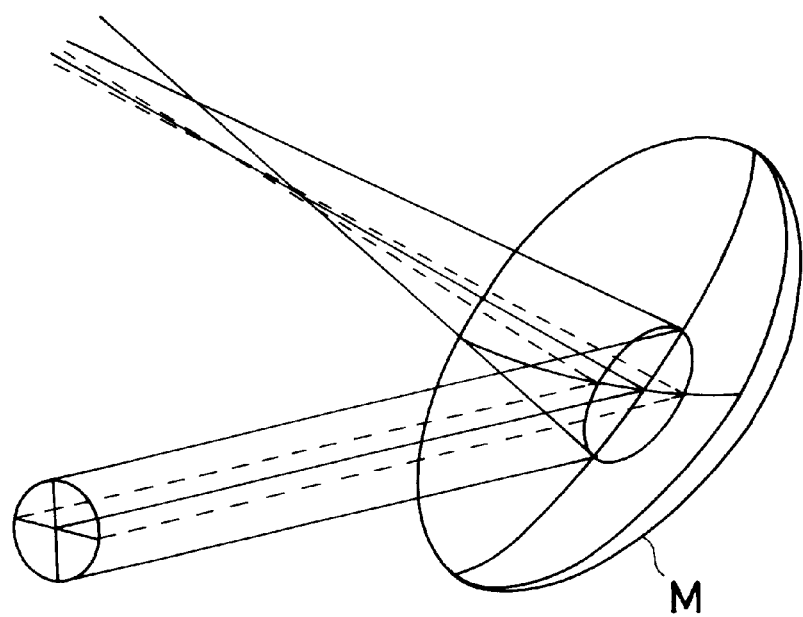
FIG. 15 shows axial coma produced by a decentered concave mirror.
Figure 16:
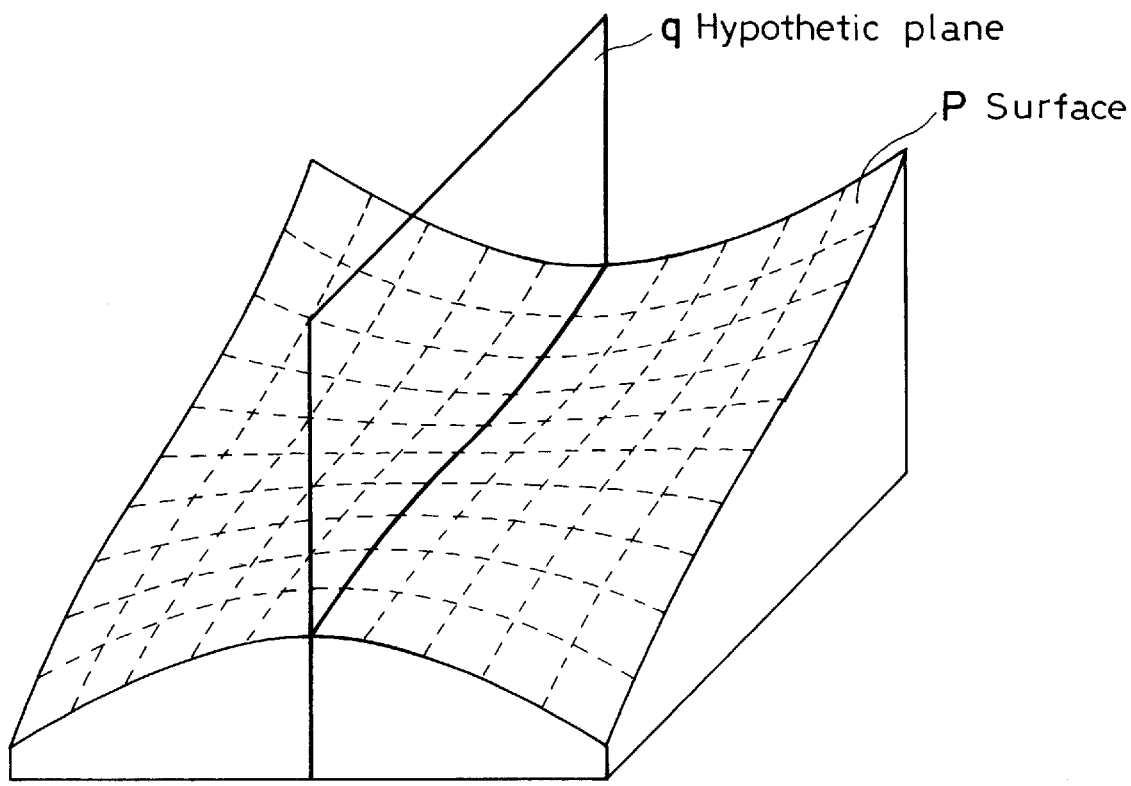
FIG. 16 illustrates one form of three-dimensional surfaces.
Figure 17:
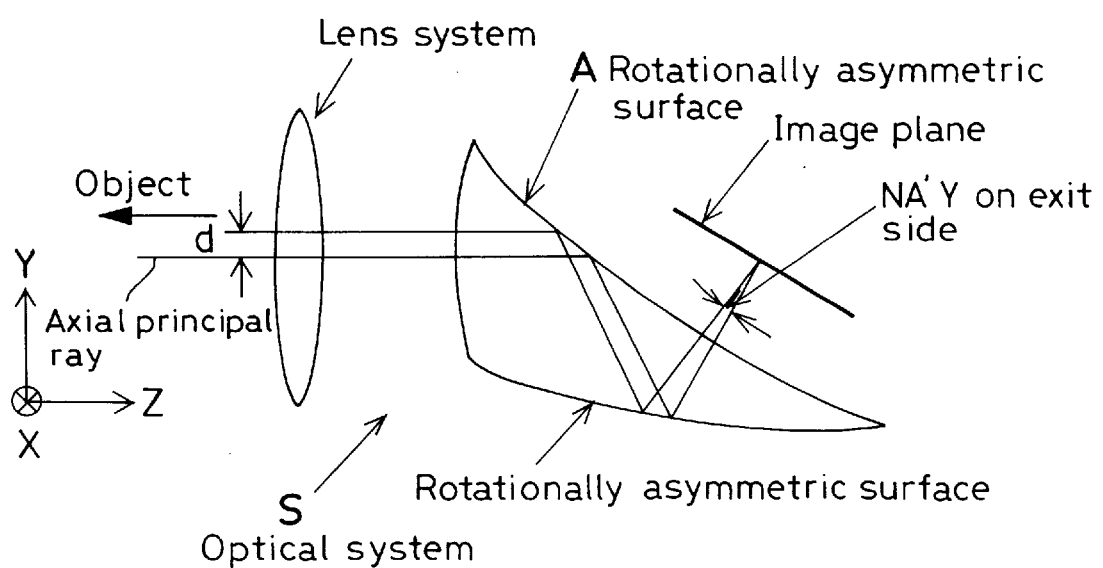
FIG. 17 is a diagram for explaining a focal length in an optical system according to the present invention.
Figure 18A:
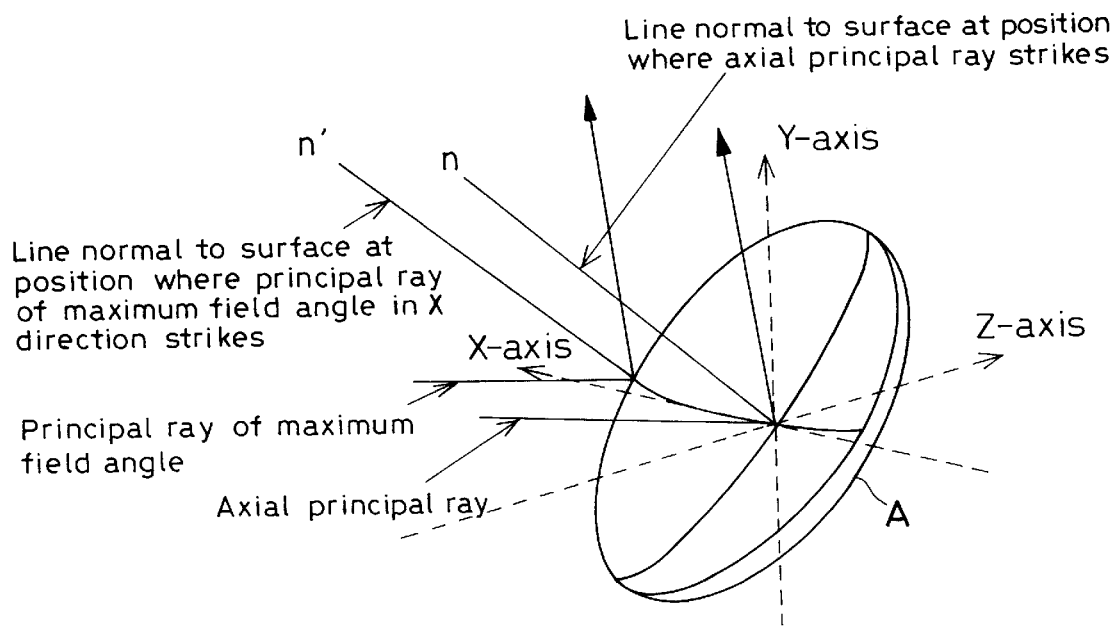
FIGS. 18(a) and 18(b) are diagrams for explaining parameter DY used in the present invention.
Figure 18B:
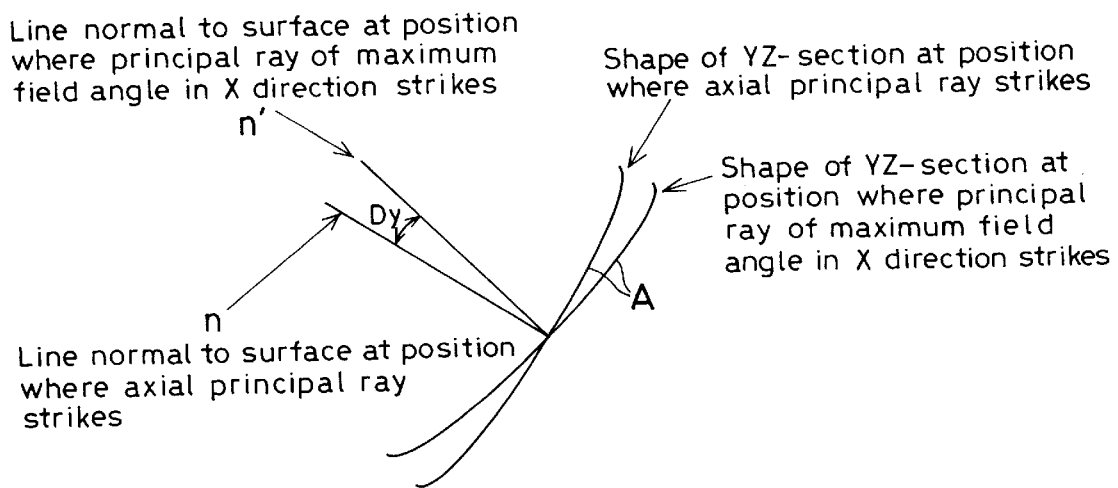

Further, as shown in FIG. 12, the variable-magnification image-forming optical system according to the present invention may be used as a taking lens 14 of a camera 16 comprising the taking lens 14, a finder 15, and a photographic film (not shown) or an image pickup device (not shown), e.g. CCD. The variable-magnification image-forming optical system according to the present invention may also be used as an objective lens or relay lens of the finder 15. Furthermore, the variable-magnification image-forming optical system according to the present invention may be used as an optical system of the finder 15 in which the first lens unit G1 to the third lens unit G3 form an objective lens, and the fourth lens unit G4 forms an ocular lens.

As will be clear from the foregoing description, it is possible according to the present invention to provide an image-forming optical system, e.g. a variable-magnification optical system, which is compact and has minimal aberrations due to decentration in comparison to rotationally symmetric transmission optical systems.

What we claim is:

1. A variable-magnification image-forming optical system comprising a first lens unit having at least one lens; a second lens unit disposed on an image side of said first lens unit; a third lens unit disposed on an image side of said second lens unit; and a fourth lens unit disposed on an image side of said third lens unit, wherein when zooming from a wide-angle end of said optical system to a telephoto end of said optical system is performed, a spacing between said first lens unit and said second lens unit and a spacing between said second lens unit and said third lens unit are varied, and wherein said fourth lens unit includes a decentered optical system having at least one curved reflecting surface and a non-rotationally symmetric curved surface operating to correct non-rotationally symmetric aberrations produced by a decentering action of said curved reflecting surface.

2. A variable-magnification image-forming optical system according to claim 1, wherein said non-rotationally symmetric curved surface is formed on a transmitting surface disposed closer to said third lens unit than said curved reflecting surface.

3. A variable-magnification image-forming optical system according to claim 1, wherein said non-rotationally symmetric curved surface is formed on a transmitting surface disposed closer to an image side of said optical system than said curved reflecting surface.

4. A variable-magnification image-forming optical system according to claim 1, wherein said non-rotationally symmetric curved surface is formed on a reflecting surface disposed closer to said third lens unit than said curved reflecting surface.

5. A variable-magnification image-forming optical system according to claim 1, wherein said non-rotationally symmetric curved surface is formed on a reflecting surface disposed closer to an image side of said optical system than said curved reflecting surface.

6. A variable-magnification image-forming optical system according to claim 1, wherein said non-rotationally symmetric curved surface is formed on said curved reflecting surface.

7. A variable-magnification image-forming optical system according to claim 1, wherein said non-rotationally symmetric curved surface is formed on a surface operating as both a reflecting surface and a transmitting surface.

8. A variable-magnification image-forming optical system according to claim 7, wherein said surface operating as both a reflecting surface and a transmitting surface performs a reflecting action by total reflection.

9. A variable-magnification image-forming optical system according to any one of claims 1 to 8, wherein said fourth lens unit includes a prism member having an entrance surface, a reflecting surface, and an exit surface, which are disposed to face each other across a medium having a refractive index (n) larger than 1.3 (n>1.3), and said non-rotationally symmetric curved surface is formed on said prism member.

10. A variable-magnification image-forming optical system according to claim 9, wherein said non-rotationally symmetric curved surface is an anamorphic surface.

11. A variable-magnification image-forming optical system according to claim 9, wherein said non-rotationally symmetric curved surface is a toric surface.

12. A variable-magnification image-forming optical system according to claim 9, wherein said non-rotationally symmetric curved surface is a three-dimensional surface having only one plane of symmetry.

13. A variable-magnification image-forming optical system according to claim 9, wherein said first lens unit has a positive power; said second lens unit has a negative power; and said third lens unit has a positive power.

14. A variable-magnification image-forming optical system according to claim 9, further comprising a fifth lens unit disposed closer to an object side of said variable-magnification image-forming optical system than said fourth lens unit.

15. A variable-magnification image-forming optical system according to claim 14, wherein said fifth lens unit is disposed between said third lens unit and said fourth lens unit.

16. A variable-magnification image-forming optical system according to claim 14, wherein said fifth lens unit is disposed between said second lens unit and said third lens unit.

17. A variable-magnification image-forming optical system according to claim 14, wherein said fifth lens unit is disposed between said first lens unit and said second lens unit.

18. A variable-magnification image-forming optical system according to any one of claims 1 to 8, wherein a plane of symmetry of said rotationally asymmetric surface is approximately coincident with a plane of decentration of each decentered surface constituting said decentered optical system.

19. A variable-magnification image-forming optical system according to any one of claims 1 to 8, wherein, assuming that a light ray emanating from a center of an object point and passing through a center of a pupil to reach a center of an image is defined as an axial principal ray, said rotationally asymmetric surface is tilted with respect to said axial principal ray.

20. A variable-magnification image-forming optical system according to any one of claims 1 to 8, wherein, assuming that a light ray emanating from a center of an object point and passing through a center of a pupil to reach a center of an image is defined as an axial principal ray, and that a Y-axis is taken in a plane of decentration of each decentered surface, and an X-axis is taken in a direction perpendicularly intersecting the Y-axis, and further that an axis constituting an orthogonal coordinate system in combination with the X- and Y-axes is defined as a Z-axis, the following condition is satisfied:

$$0.00001 < |DY| < 0.1 \tag{2-1}$$

where DY denotes a difference between a value of a tangent of a line normal to at least one rotationally asymmetric surface in a YZ-plane at a position where a principal ray at a maximum field angle in a direction of the X-axis impinges on said surface and a value of a tangent of a line normal to said surface in a YZ-plane at a position where the axial principal ray impinges on said surface.

21. A variable-magnification image-forming optical system according to any one of claims 1 to 8, wherein, assuming that a Y-axis is taken in a plane of decentration of each decentered surface, and an X-axis is taken in a direction perpendicularly intersecting the Y-axis, and that an axis constituting an orthogonal coordinate system in combination with the X- and Y-axes is defined as a Z-axis, one of the following conditions (3-1) and (3-2) is satisfied:

$$0 < |Cxn| < 1 \tag{3-1}$$

$$1 < |Cxn| < 10 \tag{3-2}$$

where Cxn denotes a ratio between a curvature in an X-axis direction of a portion of at least one rotationally asymmetric surface at which a principal ray at a maximum field angle in a positive direction of the Y-axis in the plane of decentration (YZ-plane) impinges on said surface and a curvature in the X-axis direction of a portion of said surface at which a principal ray at a maximum field angle in a negative direction of the Y-axis impinges on said surface.

22. A variable-magnification image-forming optical system according to any one of claims 1 to 8, which satisfies the following condition:

$$0.01 < |Fg1/Fg2| < 100 \tag{4-1}$$

where Fg1 is a focal length of said first lens unit, and Fg2 is a focal length of said second lens unit.

23. A variable-magnification image-forming optical system according to any one of claims 1 to 8, which satisfies the following condition:

$$0.01 < |Fg1/Fg3| < 100 \tag{5-1}$$

where Fg1 is a focal length of said first lens unit, and Fg3 is a focal length of said third lens unit.

24. A variable-magnification image-forming optical system according to any one of claims 1 to 8, which satisfies the following condition:

$$0.01 < |Fg1/Fx| < 100 \tag{6-1}$$

where Fg1 is a focal length of said first lens unit, and Fx is a focal length of said variable-magnification image-forming optical system with respect to a light ray in an X direction which is perpendicular to a plane of decentration of each decentered surface.

25. A variable-magnification image-forming optical system according to any one of claims 1 to 8, which satisfies the following condition:

$$0.001 < |Fg2/Fx| < 1000 \tag{7-1}$$

where Fg2 is a focal length of said second lens unit, and Fx is a focal length of said variable-magnification image-forming optical system with respect to a light ray in an X direction which is perpendicular to a plane of decentration of each decentered surface.

26. A variable-magnification image-forming optical system according to any one of claims 1 to 8, which satisfies the following condition:

$$0.01 < |Fg3/Fx| < 1000 \tag{8-1}$$

where Fg3 is a focal length of said third lens unit, and Fx is a focal length of said variable-magnification image-forming optical system with respect to a light ray in an X direction which is perpendicular to a plane of decentration of each decentered surface.

27. A variable-magnification image-forming optical system according to any one of claims 1 to 8, wherein, assuming that a light ray emanating from a center of an object point and passing through a center of a pupil to reach a center of an image is defined as an axial principal ray, and that a Y-axis is taken in a plane of decentration of each decentered surface, and an X-axis is taken in a direction perpendicularly intersecting the Y-axis, and further an axis constituting an orthogonal coordinate system in combination with the X- and Y-axes is defined as a Z-axis, and further that said axial principal ray and a light ray which is parallel to said axial principal ray at a slight distance d in an X-axis direction are made to enter said variable-magnification image-forming optical system from an entrance side thereof, and a sine of an angle formed between said two rays as projected on an XZ-plane at an exit side of said variable-magnification image-forming optical system is denoted by NA'X, and further that a value obtained by dividing said NA'X by said distance d between said parallel rays is denoted by Px, and a power in the X-axis direction of that portion of said rotationally asymmetric surface on which said axial principal ray strikes is denoted by Pxn, the following condition is satisfied:

$$0.0001 < |Pxn/Px| < 1000 \qquad (9\text{-}1).$$

28. A variable-magnification image-forming optical system according to claim 27, wherein said Pxn/Px satisfies the following condition:

$$0.001 < |Pxn/Px| < 100 \qquad (9\text{-}2).$$

29. A variable-magnification image-forming optical system according to claim 28, wherein said Pxn/Px satisfies the following condition:

$$0.001 < |Pxn/Px| < 10 \qquad (9\text{-}3).$$

30. A variable-magnification image-forming optical system according to any one of claims 1 to 8, wherein, assuming that a light ray emanating from a center of an object point and passing through a center of a pupil to reach a center of an image is defined as an axial principal ray, and that a Y-axis is taken in a plane of decentration of each decentered surface, and an X-axis is taken in a direction perpendicularly intersecting the Y-axis, and further an axis constituting an orthogonal coordinate system in combination with the X- and Y-axes is defined as a Z-axis, and further that said axial principal ray and a light ray which is parallel to said axial principal ray at a slight distance d in a Y-axis disaid variableade to enter said variable-magnification image-forming optical system from an entrance side thereof, and a sine of an angle formed between said two rays as projected on a YZ-plane at an exit side of said variable-magnification image-forming optical system is denoted by NA'Y, and further that a value obtained by dividing said NA'Y by said distance d between said parallel rays is denoted by Py, and a power in the Y-axis direction of that portion of said rotationally asymmetric surface on which said axial principal ray strikes is denoted by Pyn, the following condition is satisfied:

$$0.0001 < |Pyn/Py| < 1000 \qquad (10\text{-}1).$$

31. A variable-magnification image-forming optical system according to claim 30, wherein said Pyn/Py satisfies the following condition:

$$0.001 < |Pyn/Py| < 100 \qquad (10\text{-}2).$$

32. A variable-magnification image-forming optical system according to claim 31, wherein said Pyn/Py satisfies the following condition:

$$0.001 < |Pyn/Py| < 10 \qquad (10\text{-}3).$$

33. A variable-magnification image-forming optical system according to any one of claims 1 to 8, wherein, assuming that a light ray emanating from a center of an object point and passing through a center of a pupil to reach a center of an image is defined as an axial principal ray, and that a Y-axis is taken in a plane of decentration of each decentered surface, and an X-axis is taken in a direction perpendicularly intersecting the Y-axis, and further an axis constituting an orthogonal coordinate system in combination with the X- and Y-axes is defined as a Z-axis, and further that said axial principal ray and a light ray which is parallel to said axial principal ray at a slight distance d in an X-axis direction are made to enter said variable-magnification image-forming optical system from an entrance side thereof, and a sine of an angle formed between said two rays as projected on an XZ-plane at an exit side of said variable-magnification image-forming optical system is denoted by NA'X, and further that a value obtained by dividing said NA'X by said distance d between said parallel rays is denoted by Px, and further that said axial principal ray and a light ray which is parallel to said axial principal ray at a slight distance d in a Y-axis direction are made to enter said variable-magnification image-forming optical system from the entrance side thereof, and a sine of an angle formed between said two rays as projected on a YZ-plane at the exit side of said variable-magnification image-forming optical system is denoted by NA'Y, and further that a value obtained by dividing said NA'Y by said distance d between said parallel rays is denoted by Py, the following condition is satisfied:

$$0.1 < Px/Py < 10 \qquad (11\text{-}1).$$

34. A variable-magnification image-forming optical system according to claim 33, wherein said Px/Py satisfies the following condition:

$$0.5 < Px/Py < 2 \qquad (11\text{-}2).$$

35. A variable-magnification image-forming optical system according to claim 34, wherein said Px/Py satisfies the following condition:

$$0.8 < Px/Py < 1.2 \qquad (11\text{-}3).$$

36. A variable-magnification image-forming optical system according to any one of claims 1 to 8, wherein said decentered optical system comprises only a first reflecting surface, wherein light rays are reflected by said first reflecting surface in a direction different from a direction in which the light rays are incident thereon.

37. A variable-magnification image-forming optical system according to any one of claims 1 to 8, wherein said decentered optical system comprises a first reflecting surface and a first transmitting surface, wherein light rays enter said decentered optical system through said first transmitting surface and are reflected by said first reflecting surface to exit from said decentered optical system through said first transmitting surface in a direction different from a direction in which the light rays are incident on said first transmitting surface.

38. A variable-magnification image-forming optical system according to any one of claims 1 to 8, wherein said decentered optical system comprises a first reflecting surface, a first transmitting surface, and a second transmitting surface, wherein light rays enter said decentered optical system through said first transmitting surface and are reflected by said first reflecting surface to exit from said decentered optical system through said second transmitting surface in a direction different from a direction in which the light rays are incident on said first transmitting surface.

39. A variable-magnification image-forming optical system according to any one of claims 1 to 8, wherein said decentered optical system comprises a first reflecting surface, a second reflecting surface, and a first transmitting surface, wherein light rays enter said decentered optical system through said first transmitting surface and are reflected by said first reflecting surface and then reflected by said second reflecting surface to exit from said decentered optical system through said first transmitting surface.

40. A variable-magnification image-forming optical system according to any one of claims 1 to 8, wherein said decentered optical system comprises a first reflecting surface, a second reflecting surface, a first transmitting surface, and a second transmitting surface, wherein light rays enter said decentered optical system through said first transmitting surface and are reflected by said first reflecting surface and then reflected by said second reflecting surface to exit from said decentered optical system through said second transmitting surface.

41. A variable-magnification image-forming optical system according to claim 40, wherein said first and second reflecting surfaces are disposed such that principal rays and reflected rays thereof substantially intersect each other in said decentered optical system.

42. A variable-magnification image-forming optical system according to claim 40, wherein said first and second reflecting surfaces are disposed such that principal rays and reflected rays thereof do not substantially intersect each other.

43. A variable-magnification image-forming optical system according to claim 42, wherein said first transmitting surface and second reflecting surface of said decentered optical system are an identical surface.

44. A variable-magnification image-forming optical system according to claim 42, wherein said first reflecting surface and second transmitting surface of said decentered optical system are an identical surface.

45. A variable-magnification image-forming optical system according to any one of claims 1 to 8, wherein said decentered optical system comprises a first reflecting surface, a second reflecting surface, a third reflecting surface, a first transmitting surface, and a second transmitting surface, wherein light rays enter said decentered optical system through said first transmitting surface and are reflected successively by said first reflecting surface, said second reflecting surface and said third reflecting surface to exit from said decentered optical system through said second transmitting surface in a direction different from a direction in which the light rays are incident on said first transmitting surface.

46. A variable-magnification image-forming optical system according to claim 45, wherein said first transmitting surface and second reflecting surface of said decentered optical system are an identical surface.

47. A variable-magnification image-forming optical system according to claim 45, wherein said first reflecting surface and third reflecting surface of said decentered optical system are an identical surface.

48. A variable-magnification image-forming optical system according to claim 45, wherein said second transmitting surface and second reflecting surface of said decentered optical system are an identical surface.

49. A variable-magnification image-forming optical system according to any one of claims 1 to 8, which is used in a camera finder.

50. An optical system for a camera finder using a variable-magnification image-forming optical system according to any one of claims 1 to 8.

* * * * *